(12) United States Patent
Kao et al.

(10) Patent No.: US 8,435,914 B2
(45) Date of Patent: May 7, 2013

(54) MIXED METAL CATALYST SYSTEMS HAVING A TAILORED HYDROGEN RESPONSE

(75) Inventors: Sun-Chueh Kao, Pearland, TX (US); Francis C. Rix, League City, TX (US); Dongming Li, Houston, TX (US); C. Jeff Harlan, Houston, TX (US); Parul A. Khokhani, Manalapan, NJ (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 13/258,945

(22) PCT Filed: May 14, 2010

(86) PCT No.: PCT/US2010/034963
§ 371 (c)(1),
(2), (4) Date: Sep. 22, 2011

(87) PCT Pub. No.: WO2010/132811
PCT Pub. Date: Nov. 18, 2010

(65) Prior Publication Data
US 2012/0046428 A1    Feb. 23, 2012

Related U.S. Application Data

(60) Provisional application No. 61/178,197, filed on May 14, 2009.

(51) Int. Cl.
*C08F 4/653* (2006.01)
*C08F 4/6592* (2006.01)
*B01J 31/22* (2006.01)

(52) U.S. Cl.
USPC ........... 502/167; 502/113; 502/120; 502/152; 526/113; 526/114; 526/160; 526/161; 526/943

(58) Field of Classification Search .................. 526/113, 526/114, 118, 119, 161, 172, 348, 943, 160; 502/113, 120, 152, 167
See application file for complete search history.

(56) References Cited

U.S. PATENT DOCUMENTS

| | | | |
|---|---|---|---|
| 4,530,914 A | 7/1985 | Ewen et al. | |
| 4,659,685 A | 4/1987 | Coleman, III et al. | |
| 4,937,299 A | 6/1990 | Ewen et al. | |
| 5,032,562 A | 7/1991 | Lo et al. | |
| 5,183,867 A | 2/1993 | Welborn, Jr. | |
| 5,470,811 A | 11/1995 | Jejelowo et al. | |
| 5,516,848 A | 5/1996 | Canich et al. | |
| 5,525,678 A | 6/1996 | Mink et al. | |
| 5,665,818 A | 9/1997 | Tilston et al. | |
| 5,696,045 A | 12/1997 | Winter et al. | |
| 6,492,472 B2 | 12/2002 | Lue et al. | |
| 6,828,394 B2 | 12/2004 | Vaughan et al. | |
| 6,956,094 B2 | 10/2005 | Mawson et al. | |
| 6,964,937 B2 | 11/2005 | Mink et al. | |
| 6,995,109 B2 | 2/2006 | Mink et al. | |
| 7,129,302 B2 | 10/2006 | Mink et al. | |
| 7,141,632 B2 | 11/2006 | Vaughan et al. | |
| 7,163,906 B2 | 1/2007 | McDaniel et al. | |
| 7,172,987 B2 | 2/2007 | Kao et al. | |
| 7,199,072 B2 | 4/2007 | Crowther et al. | |
| 2006/0135713 A1* | 6/2006 | Leclerc et al. | ................. 526/204 |
| 2009/0286944 A1* | 11/2009 | Ackerman et al. | ............. 526/147 |

FOREIGN PATENT DOCUMENTS

| | | |
|---|---|---|
| EP | 0310734 B1 | 11/1994 |
| EP | 743327 A2 | 11/1996 |
| EP | 527221 B1 | 9/1997 |
| EP | 743327 A3 | 4/1998 |
| EP | 729387 B1 | 9/1999 |
| EP | 676418 B1 | 7/2000 |
| EP | 1516018 B1 | 11/2005 |
| WO | 9609328 A1 | 3/1996 |
| WO | 9735891 A1 | 10/1997 |
| WO | 9849209 A1 | 11/1998 |
| WO | 0246250 A2 | 6/2002 |
| WO | 2006036748 A2 | 4/2006 |
| WO | 2006066126 A2 | 6/2006 |
| WO | 2007076231 A2 | 7/2007 |
| WO | 2008060512 A1 | 5/2008 |
| WO | 2009064482 A1 | 5/2009 |

* cited by examiner

*Primary Examiner* — Caixia Lu
(74) *Attorney, Agent, or Firm* — Kristina Leavitt; Jennifer A. Schmidt; Leandro Arechederra, III

(57) ABSTRACT

A polymerization catalyst system and polymerization processes using the catalyst systems are disclosed. The polymerization catalyst systems may include a) a first catalyst compound, and b) a second catalyst compound, wherein the first catalyst compound includes an oxadiazole-containing compound. In some embodiments, the oxadiazole-containing compound has essentially no hydrogen response, thus allowing better and/or tailored control of product properties when producing polymers using the catalyst system.

13 Claims, 3 Drawing Sheets

MIXED METAL CATALYST SYSTEMS HAVING A TAILORED HYDROGEN RESPONSE

CROSS-REFERENCE TO RELATED APPLICATIONS

This application is a National Stage application under 36 U.S.C. §371 of International Application No. PCT/US2010/34963, filed May 14, 2010, that claims the benefit of Ser. No. 61/178,197, filed May 14, 2009, the disclosures of which are incorporated by reference in their entireties.

FIELD OF THE INVENTION

Disclosed herein are catalyst systems useful for the production of polymers. The catalyst system may include one or more catalyst compounds having a nil or negligible hydrogen response. The catalyst system may be a bimetallic catalyst system. The compound having a nil or negligible hydrogen response may comprise an oxadiazole compound.

BACKGROUND

Polyolefin resins having bimodal molecular weight distributions and/or bimodal composition distributions are desirable in a number of applications. Resins including a mixture of a relatively higher molecular weight polyolefin and a relatively lower molecular weight polyolefin can be produced to take advantage of the increased strength properties of higher molecular weight resins and articles and films made therefrom, and the better processing characteristics of lower molecular weight resins.

Bimetallic catalysts such as those disclosed in U.S. Pat. Nos. 5,032,562 and 5,525,678, and European Patent EP 0 729 387, can produce bimodal polyolefin resins in a single reactor. These catalysts typically include a non-metallocene catalyst component and a metallocene catalyst component which produce polyolefins having different average molecular weights. U.S. Pat. No. 5,525,678, for example, discloses a bimetallic catalyst in one embodiment including a titanium non-metallocene component which produces a higher molecular weight resin, and a zirconium metallocene component which produces a lower molecular weight resin.

As stated in U.S. Pat. No. 6,995,109, controlling the relative amounts of each catalyst in a reactor, or the relative reactivity of the different catalysts, allows control of the bimodal product resin. Other background references include EP 0 676 418, WO 98/49209, WO 97/35891, and U.S. Pat. No. 5,183,867.

Bimetallic catalysts are also disclosed in, for example, U.S. Pat. Nos. 7,199,072, 7,141,632, 7,172,987, 7,129,302, 6,964,937, 6,956,094, and 6,828,394.

Hydrogen gas is often used in olefin polymerization to control the final properties of the polyolefin, where the hydrogen gas acts as a chain transfer agent during polymerization. Single metal based catalyst using hydrogen as a chain transfer agent may produce a polymerization product with relatively predictable molecular weight and molecular weight distribution. Further, changes in reactor hydrogen concentration may additionally be used to alter the molecular weight and molecular weight distribution of the resulting polymer.

Bimetallic catalysts such as those described in the patents listed above, however, typically include catalyst components having different hydrogen responses (each having a different reactivity toward hydrogen). For example, a first catalyst component may have a higher response to changes in reactor hydrogen concentration than a second catalyst component. Thus, in contrast to single metal based catalysts, a change in reactor hydrogen concentration may affect molecular weight, molecular weight distributions, and other properties of the resulting bimodal polymer when using a bimetallic catalyst. Owing to the differing hydrogen response of the components in the bimetallic catalyst, control of polymer properties is considerably more complicated and less predictable, as there is an additional independent variable (a second catalyst having a different hydrogen response) affecting polymerization dynamics.

A need exists for bimetallic catalyst systems having predictable and controllable responses to changes in reactor hydrogen concentration.

SUMMARY

Disclosed herein are polymerization catalyst systems including: a first catalyst compound; and a second catalyst compound; wherein the first catalyst compound comprises an oxadiazole-containing compound having essentially no hydrogen response.

In some embodiments, the catalyst system may be a mixed or bimetallic catalyst system wherein the second catalyst compound comprises at least one of a metallocene and a Group 15-containing catalyst compound. The mixed catalyst system may be capable of producing a polymer product having an essentially unimodal molecular weight distribution.

Also disclosed herein are processes for producing a polyolefin, including: contacting at least one olefin monomer with one of the catalyst systems described above in a polymerization reactor to form a polyolefin.

Other aspects and advantages will be apparent from the following description and the appended claims.

DEFINITIONS

Figure 1:
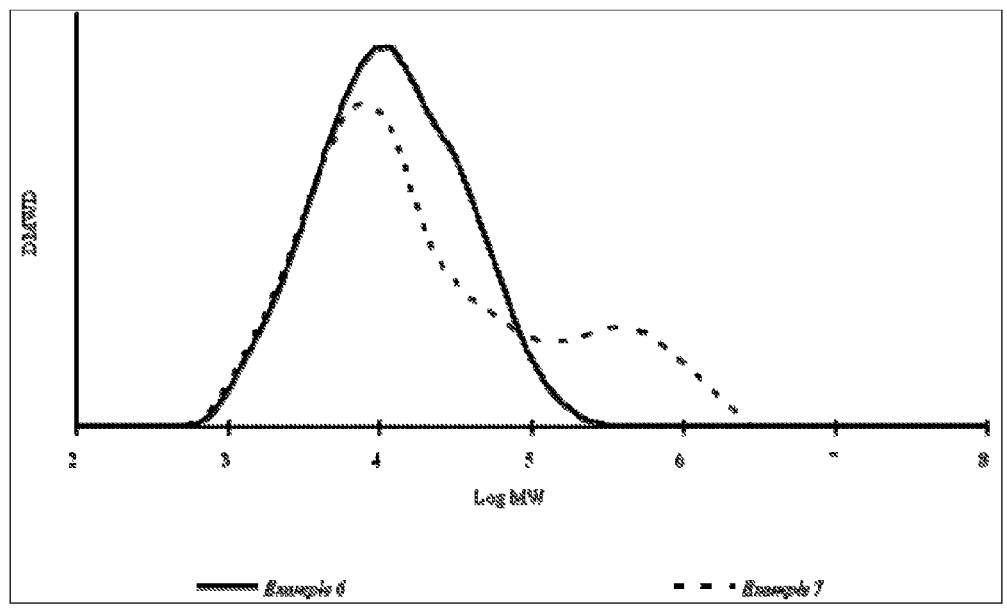
FIG. 1 presents GPC results for polymers formed in Examples 6 and 7.

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

As used herein the singular forms "a," "an," and "the" include plural referents unless otherwise specified. Thus, for example, reference to "a leaving group" as in a moiety "substituted with a leaving group" includes more than one leaving group, such that the moiety may be substituted with two or more such groups. Similarly, reference to "a halogen atom" as in a moiety "substituted with a halogen atom" includes more than one halogen atom, such that the moiety may be substituted with two or more halogen atoms, reference to "a substituent" includes one or more substituents, reference to "a ligand" includes one or more ligands, and the like.

As used herein, all reference to the Periodic Table of the Elements and groups thereof is to the NEW NOTATION published in HAWLEY'S CONDENSED CHEMICAL DICTIONARY, Thirteenth Edition, John Wiley & Sons, Inc., (1997) (reproduced there with permission from IUPAC), unless reference is made to the Previous IUPAC form noted with Roman numerals (also appearing in the same), or unless otherwise noted.

The present disclosure provides catalyst systems for olefin polymerization, methods of making and method of using said catalyst systems, and polymer and products made therewith. The terms "mixed catalyst system" and "mixed catalyst" may be used interchangeably herein with "catalyst system."

As used herein, the phrase "characterized by the formula" and/or "characterized by the structure" is not intended to be limiting and is used in the same way that "comprising" is commonly used. The term "independently selected" is used herein to indicate that the R groups, e.g., $R^1$, $R^2$, $R^3$, $R^4$, and $R^5$ can be identical or different (e.g. $R^1$, $R^2$, $R^3$, $R^4$, and $R^5$ may all be substituted alkyls or $R^1$ and $R^2$ may be a substituted alkyl and $R^3$ may be an aryl, etc.). Use of the singular includes use of the plural and vice versa (e.g., a hexane solvent, includes hexanes). A named R group will generally have the structure that is recognized in the art as corresponding to R groups having that name.

The terms "precatalyst", "catalyst", "precatalyst metal compound", "catalyst metal compound", "catalyst component" are generally used interchangeably in this specification, but those of skill in the art may recognize certain precatalysts as catalysts and vice versa.

The terms "monomer" and "comonomer" are generally used interchangeably in this specification, but those of skill in the art may recognize certain monomers as comonomers and vice versa.

For the purposes of illustration, representative certain groups are defined herein. These definitions are intended to supplement and illustrate, not preclude, the definitions known to those of skill in the art. "Optional" or "optionally" means that the subsequently described event or circumstance may or may not occur, and that the description includes instances where said event or circumstance occurs and instances where it does not. For example, the phrase "optionally substituted hydrocarbyl" means that a hydrocarbyl moiety may or may not be substituted and that the description includes both unsubstituted hydrocarbyl and hydrocarbyl where there is substitution.

The term "alkyl" as used herein refers to a branched or unbranched saturated hydrocarbon group typically although not necessarily containing 1 to about 50 carbon atoms, such as methyl, ethyl, n-propyl, isopropyl, n-butyl, isobutyl, t-butyl, octyl, decyl, and the like, as well as cycloalkyl groups such as cyclopentyl, cyclohexyl and the like. Generally, although again not necessarily, alkyl groups herein may contain 1 to about 12 carbon atoms. The term "lower alkyl" intends an alkyl group of one to six carbon atoms, specifically one to four carbon atoms. The term alkyl also refers to divalent alkyls such as —$CR_2$— which may be referred to as alkylenes or hydrocarbylenes and may be substituted with one or more substituent groups or heteroatom containing groups. "Substituted alkyl" refers to alkyl substituted with one or more substituent groups (e.g., benzyl or chloromethyl), and the terms "heteroatom-containing alkyl" and "heteroalkyl" refer to alkyl in which at least one carbon atom is replaced with a heteroatom (e.g., —$CH_2OCH_3$ is an example of a heteroalkyl).

The term "alkenyl" as used herein refers to a branched or unbranched hydrocarbon group typically although not necessarily containing 2 to about 50 carbon atoms and at least one double bond, such as ethenyl, n-propenyl, isopropenyl, n-butenyl, isobutenyl, octenyl, decenyl, and the like. Generally, although again not necessarily, alkenyl groups herein contain 2 to about 12 carbon atoms. The term "lower alkenyl" intends an alkenyl group of two to six carbon atoms, specifically two to four carbon atoms. "Substituted alkenyl" refers to alkenyl substituted with one or more substituent groups, and the terms "heteroatom-containing alkenyl" and "heteroalkenyl" refer to alkenyl in which at least one carbon atom is replaced with a heteroatom.

The term "alkynyl" as used herein refers to a branched or unbranched hydrocarbon group typically although not necessarily containing 2 to about 50 carbon atoms and at least one triple bond, such as ethynyl, n-propynyl, isopropynyl, n-butynyl, isobutynyl, octynyl, decynyl, and the like. Generally, although again not necessarily, alkynyl groups herein may have 2 to about 12 carbon atoms. The term "lower alkynyl" intends an alkynyl group of two to six carbon atoms, specifically three or four carbon atoms. "Substituted alkynyl" refers to alkynyl substituted with one or more substituent groups, and the terms "heteroatom-containing alkynyl" and "heteroalkynyl" refer to alkynyl in which at least one carbon atom is replaced with a heteroatom.

The term "alkoxy" as used herein intends an alkyl group bound through a single, terminal ether linkage; that is, an "alkoxy" group may be represented as —O-alkyl where alkyl is as defined above. A "lower alkoxy" group intends an alkoxy group having one to six, more specifically one to four, carbon atoms. The term "aryloxy" is used in a similar fashion, with aryl as defined below. The term "hydroxy" refers to —OH.

Similarly, the term "alkylthio" as used herein intends an alkyl group bound through a single, terminal thioether linkage; that is, an "alkylthio" group may be represented as —S-alkyl where alkyl is as defined above. A "lower alkyl thio" group intends an alkyl thio group having one to six, more specifically one to four, carbon atoms. The term "arylthio" is used similarly, with aryl as defined below. The term "thioxy" refers to —SH.

The term "aryl" as used herein, and unless otherwise specified, refers to an aromatic substituent containing a single aromatic ring or multiple aromatic rings that are fused together, linked covalently, or linked to a common group such as a methylene or ethylene moiety. More specific aryl groups contain one aromatic ring or two or three fused or linked aromatic rings, e.g., phenyl, naphthyl, biphenyl, anthracenyl, phenanthrenyl, and the like. In particular embodiments, aryl substituents have 1 to about 200 carbon atoms, typically 1 to about 50 carbon atoms, and specifically 1 to about 20 carbon atoms. "Substituted aryl" refers to an aryl moiety substituted with one or more substituent groups, (e.g., tolyl, mesityl and perfluorophenyl) and the terms "heteroatom-containing aryl" and "heteroaryl" refer to aryl in which at least one carbon atom is replaced with a heteroatom (e.g., rings such as thiophene, pyridine, is zole, pyrazole, pyrrole, furan, oxadiazole, and the like, and/or benzo-fused analogues of these rings are included in the term "heteroaryl"). In some embodiments herein, multi-ring moieties are substituents and in such an embodiment the multi-ring moiety can be attached at an appropriate atom. For example, "naphthyl" can be 1-naphthyl or 2-naphthyl; "anthracenyl" can be 1-anthracenyl, 2-anthracenyl or 9-anthracenyl; and "phenanthrenyl" can be 1-phenanthrenyl, 2-phenanthrenyl, 3-phenanthrenyl, 4-phenanthrenyl or 9-phenanthrenyl.

The term "aralkyl" refers to an alkyl group with an aryl substituent, and the term "aralkylene" refers to an alkylene group with an aryl substituent; the term "alkaryl" refers to an aryl group that has an alkyl substituent, and the term "alkarylene" refers to an arylene group with an alkyl substituent.

The terms "halo" and "halogen" and "halide" are used in the conventional sense to refer to a chloro, bromo, fluoro or iodo substituent. The terms "haloalkyl," "haloalkenyl" or "haloalkynyl" (or "halogenated alkyl," "halogenated alkenyl," or "halogenated alkynyl") refers to an alkyl, alkenyl or alkynyl group, respectively, in which at least one of the hydrogen atoms in the group has been replaced with a halogen atom.

The term "heteroatom-containing" as in a "heteroatom-containing hydrocarbyl group" refers to a molecule or molecular fragment in which one or more carbon atoms is replaced with an atom other than carbon, e.g., nitrogen, oxygen, sulfur, phosphorus, boron or silicon. Similarly, the term "heteroalkyl" refers to an alkyl substituent that is heteroatom-containing, the term "heterocyclic" refers to a cyclic substituent that is heteroatom-containing, the term "heteroaryl" refers to an aryl substituent that is heteroatom-containing, and the like. When the term "heteroatom-containing" appears prior to a list of possible heteroatom-containing groups, it is intended that the term apply to every member of that group. That is, the phrase "heteroatom-containing alkyl, alkenyl and alkynyl" is to be interpreted as "heteroatom-containing alkyl, heteroatom-containing alkenyl and heteroatom-containing alkynyl."

"Hydrocarbyl" refers to hydrocarbyl radicals containing 1 to about 50 carbon atoms, specifically 1 to about 24 carbon atoms, most specifically 1 to about 16 carbon atoms, including branched or unbranched, saturated or unsaturated species, such as alkyl groups, alkenyl groups, aryl groups, and the like. The term "lower hydrocarbyl" intends a hydrocarbyl group of one to six carbon atoms, specifically one to four carbon atoms. "Substituted hydrocarbyl" refers to hydrocarbyl substituted with one or more substituent groups, and the terms "heteroatom-containing hydrocarbyl" and "heterohydrocarbyl" refer to hydrocarbyl in which at least one carbon atom is replaced with a heteroatom.

By "substituted" as in "substituted hydrocarbyl," "substituted aryl," "substituted alkyl," "substituted alkenyl" and the like, as alluded to in some of the aforementioned definitions, is meant that in the hydrocarbyl, hydrocarbylene, alkyl, alkenyl, aryl or other moiety, at least one hydrogen atom bound to a carbon atom is replaced with one or more substituents that are functional groups such as hydroxyl, alkoxy, alkylthio, phosphino, amino, halo, silyl, and the like. When the term "substituted" appears prior to a list of possible substituted groups, it is intended that the term apply to every member of that group. That is, the phrase "substituted alkyl, alkenyl and alkynyl" is to be interpreted as "substituted alkyl, substituted alkenyl and substituted alkynyl." Similarly, "optionally substituted alkyl, alkenyl and alkynyl" is to be interpreted as "optionally substituted alkyl, optionally substituted alkenyl and optionally substituted alkynyl."

By "divalent" as in "divalent hydrocarbyl", "divalent alkyl", "divalent aryl" and the like, is meant that the hydrocarbyl, alkyl, aryl or other moiety is bonded at two points to atoms, molecules or moieties with the two bonding points being covalent bonds. The term "aromatic" is used in its usual sense, including unsaturation that is essentially delocalized across multiple bonds, such as around a ring.

As used herein the term "silyl" refers to the —$SiZ^1Z^2Z^3$ radical, where each of $SiZ^1Z^2Z^3$ is independently selected from the group consisting of hydride and optionally substituted alkyl, alkenyl, alkynyl, heteroatom-containing alkyl, heteroatom-containing alkenyl, heteroatom-containing alkynyl, aryl, heteroaryl, alkoxy, aryloxy, amino, silyl and combinations thereof As used herein the term "boryl" refers to the —$BZ^1Z^2$ group, where each of $Z^1$ and $Z^2$ is as defined above. As used herein, the term "phosphino" refers to the group —$PZ^1Z^2$, where each of $Z^1$ and $Z^2$ is as defined above. As used herein, the term "phosphine" refers to the group: $PZ^1Z^2Z^3$, where each of $Z^1$, $Z^2$, $Z^3$ as defined above. The term "amino" is used herein to refer to the group —$NZ^1Z^2$, where each of $Z^1$ and $Z^2$ is as defined above. The term "amine" is used herein to refer to the group: $NZ^1Z^2Z^3$, where each of $Z^1$, $Z^2$, $Z^3$ is as defined above.

The term "saturated" refers to lack of double and triple bonds between atoms of a radical group such as ethyl, cyclohexyl, pyrrolidinyl, and the like. The term "unsaturated" refers to the presence of one or more double and triple bonds between atoms of a radical group such as vinyl, acetylide, oxazolinyl, cyclohexenyl, acetyl and the like.

DETAILED DESCRIPTION

Disclosed herein are catalyst systems useful for the production of polymers. The catalyst system may include two or more catalyst compounds, including one or more catalyst compounds having a nil or negligible hydrogen response. The compound having a nil or negligible hydrogen response may comprise an oxadiazole compound.

Also disclosed herein are processes to produce a polymer using the above described catalyst systems. It has been found that by limiting the number of catalyst compounds in a catalyst system that have a hydrogen response may allow for control of polymer properties that is considerably less complicated and more predictable, as there are fewer independent variables affecting polymerization dynamics (such as multiple catalysts, each having a different hydrogen response).

By limiting the hydrogen response of one or more catalyst compounds in a catalyst system, the properties of the product polymers may be more easily tailored and controlled during polymerization. For example, use of a catalyst system including two or more catalyst components, the molecular weight of the polymer produced by the catalyst component with a negligible hydrogen response is predictable, and thus varying the polymerization conditions affects essentially only the properties of the polymer produced by the remaining catalyst component(s), and such a catalyst system may allow for the production of polymers having essentially unimodal molecular weight distributions. As used herein, an "essentially unimodal molecular weight distributions" refers to a molecular weight distribution having, in general, one large peak and zero or more shoulders or other points of inflection. In some embodiments, catalyst systems according to embodiments disclosed herein may be used to produce a polymer having an essentially uniform molecular weight distribution in a single reactor.

In other embodiments, catalyst systems disclosed herein may allow for the production of polymers having bimodal or multimodal molecular weight distributions. A bimodal polymer/resin is defined herein as a polymer/resin comprising two peaks in it's molecular weight distribution, one of the two peaks having a higher average molecular weight (defined herein as the high molecular weight component) than the other component (defined as the low molecular weight component). A multimodal polymer/resin is defined as a polymer/resin comprising more than two peaks in the molecular weight distribution.

In other embodiments, a particular catalyst system may allow for the production of both essentially unimodal and bimodal or multimodal molecular weight distributions, depending upon the reaction conditions (temperature pressure, hydrogen concentration, comonomer concentration, etc.).

As used herein, the term "catalyst compound" refers to a metal compound, which when combined with an activator, polymerizes olefins. The term "activator" is used interchangeably with the term "co-catalyst," and the term "catalyst system" refers to a combination of catalyst(s), activator(s), and optionally support material(s).

The hydrogen response of a catalyst compound in a polymerization process is often judged by the change in mole ratio of hydrogen concentration to monomer (e.g., ethylene) concentration required in the polymerization medium to achieve a certain change in polymer melt index or molecular weight. In a gas phase polymerization process this would be derived from the concentrations of hydrogen and monomer in the gas phase. In a slurry phase polymerization process this would be derived from the concentrations of hydrogen and monomer in the liquid diluent phase. In a homogeneous solution phase polymerization process this would be derived from the concentrations of hydrogen and monomer in the solution phase.

The polymerization catalyst systems disclosed herein include at least two catalyst compounds, where one or more of the catalyst compounds have essentially no hydrogen response. As used herein, the term "hydrogen response" refers to the reactivity of a catalyst compound with respect to hydrogen. Catalyst compounds exhibiting a hydrogen response will incorporate greater or lesser amounts of hydrogen into the polymer produced as a function of reactor hydrogen concentration. Catalysts exhibiting essentially no hydrogen response, according to embodiments disclosed herein, have a very low, i.e., zero or near zero order, reactivity with respect to hydrogen concentration. In other words, catalysts exhibiting essentially no hydrogen response will react with hydrogen at an essentially constant rate, regardless of reactor hydrogen concentration. One skilled in the art will recognize that GPC measurements for a given polymer sample may vary slightly, and catalysts may be considered to have a near zero order hydrogen response or to react with hydrogen at an essentially constant rate even with some movement in the GPC results. In some embodiments, catalysts may be considered to have essentially no hydrogen response where the weight average molecular weight of the polymer changes by less than 10% when increasing the reactor hydrogen concentration from 0 to 10,000 ppm, such as when analyzing the catalysts using the procedures for conducting ethylene polymerizations in a laboratory gas phase reactor, as detailed below. In other embodiments, catalysts may be considered to have essentially no hydrogen response where the weight average molecular weight of the polymer changes by less than 7.5% when increasing the reactor hydrogen concentration from 0 to 10,000 ppm; preferably less than 6%; preferably less than 5%; preferably less than 4%; preferably less than 3%; preferably less than 2%; and less than the GPC test error in some embodiments.

For example, bimetallic catalyst systems disclosed herein may include a first catalyst compound for producing a high molecular weight polymer fraction and a second catalyst compound for producing a low molecular weight polymer fraction, thus producing a bimodal or multimodal polymer. At least one of the first catalyst compound and the second catalyst compound has essentially no hydrogen response. In some embodiments, the catalyst compound for producing a high molecular weight polymer fraction may have essentially no hydrogen response. In other embodiments, the catalyst compound for producing a low molecular weight polymer fraction may have essentially no hydrogen response. The terms high molecular weight polymer fraction and low molecular weight polymer fraction, as used herein, indicate that the polymer produced by the respective catalyst compound is of a higher or lower molecular weight than the counterpart catalyst compound.

In some embodiments, catalyst systems disclosed herein may include three or more catalyst compounds, where one or more of the catalyst compounds may have essentially no hydrogen response. In such embodiments, the catalyst compound having essentially no hydrogen response may be used for producing a low molecular weight polymer fraction, an intermediate molecular weight polymer fraction, or a high molecular weight polymer fraction.

Polymers produced using catalysts according to embodiments disclosed herein may have an essentially unimodal, bimodal, or multimodal molecular weight distribution (Mw/Mn). In a preferred embodiment, the polymer produced has a density of 0.89 to 0.97 g/cc, an MI ($I_2$) of 0.03-2000 g/10 min, an FI ($I_{21}$) of less than 1-200 g/10 min, an MFR ($I_{21}/I_2$) of 30-400, an overall Mw of 50,000 to 500,000, an overall Mn of 5,000-60,000 and an Mw/Mn of 10-60.

In some embodiments, the low molecular weight fraction (~500-~50,000) has a density of 0.935-0.975 g/cc and the high molecular weight fraction (~50,000-~8,000,000) has a density of 0.910-0.950 g/cc. These polymers are particularly useful for film and pipe, especially, for PE-100 pipe applications.

In other embodiments, the polymer has the following molecular weight distribution (MWD) characteristics. The MWDs, as obtained from size exclusion chromatography (SEC), can be deconvoluted using the bimodal fitting program. The preferred split of the polymer, the ratio of Wt % of HMW fraction to the Wt % of LMW fraction, is in the range from 20-80 to 80-20 in some embodiments, in the range from 30-70 to 70-30 in other embodiments, and in the range from 40-60 to 60-40 in yet other embodiments.

The SEC curve can be further analyzed to give percent of Wt % >1MM, which is the weight percent of the total MWD that has a molecular weight greater than 1 million, and Wt % >100K, which is the weight percent of the total MWD that has a molecular weight greater than 100,000. The weight percent ratio ("WPR") is simply Wt % >1MM divided by Wt % >100K. 100,000 was used as an approximate means of dividing the total MWD into a HMW (high molecular weight) and LMW (low molecular weight) region. This ratio gives a simple but sensitive indication of the relative amount of the very high molecular weight species in the HMW region of the MWD. In some embodiments, the polymer has a range of weight percent ratio in the range of from 10 to 30, or in the range of from 15 to 25. The WPR may influence the stability of blown bubbles during film extrusion.

Catalyst Compound with Essentially No $H_2$ Response

Catalyst compounds for producing an intermediate molecular weight polymer fraction and/or having essentially no hydrogen response useful in embodiments disclosed herein include various catalyst compounds comprising an oxadiazole compound, either as a ligand or as an electron donor compound to control hydrogen response.

The catalyst compounds comprising an oxadiazole compound may be represented by the following structure (I):

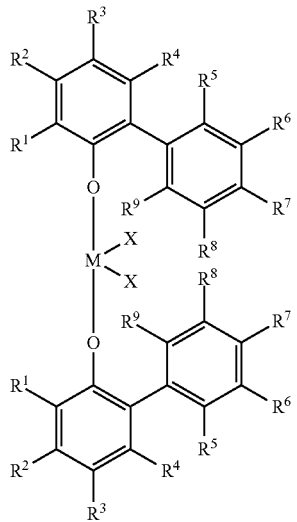

where:
M is selected from the group consisting of Ti, Zr, and Hf;
at least one of $R^1$ through $R^9$ is substituted with a moiety having the following structure (II):

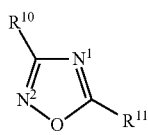

where structure II is attached at any one of $R^1$ through $R^9$ at the $R^{10}$ or $R^{11}$ position;
at least one of nitrogen $N^1$ or $N^2$ of Structure II forms a dative bond with metal M; and
each of $R^1$ through $R^{11}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine;
X is a leaving group.

Each X in structure (I) is independently selected from the group consisting of: any leaving group in one embodiment; halogen ions, hydrides, $C_1$ to $C_{12}$ alkyls, $C_2$ to $C_{12}$ alkenyls, $C_6$ to $C_{12}$ aryls, $C_7$ to $C_{20}$ alkylaryls, $C_1$ to $C_{12}$ alkoxys, $C_6$ to $C_{16}$ aryloxys, $C_7$ to $C_{18}$ alkylaryloxys, $C_1$ to $C_{12}$ fluoroalkyls, $C_6$ to $C_{12}$ fluoroaryls, and $C_1$ to $C_{12}$ heteroatom-containing hydrocarbons and substituted derivatives thereof in a more particular embodiment; hydride, halogen ions, $C_1$ to $C_6$ alkyls, $C_2$ to $C_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in yet a more particular embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in yet a more particular embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet a more particular embodiment.

Other non-limiting examples of X groups in structure (I) include amines, phosphines, ethers, carboxylates, dienes, hydrocarbon radicals having from 1 to 20 carbon atoms, fluorinated hydrocarbon radicals (e.g., —$C_6F_5$ (pentafluorophenyl)), fluorinated alkylcarboxylates (e.g., $CF_3C(O)O^-$), hydrides and halogen ions and combinations thereof Other examples of X ligands include alkyl groups such as cyclobutyl, cyclohexyl, methyl, heptyl, tolyl, trifluoromethyl, tetramethylene, pentamethylene, methylidene, methoxy, ethyoxy, propoxy, phenoxy, bis(N-methylanilide), dimethylamide, dimethylphosphide radicals and the like. In one embodiment, two or more X's form a part of a fused ring or ring system.

In some embodiments, catalyst compounds comprising an oxadiazole compound may be represented by the following structure (III):

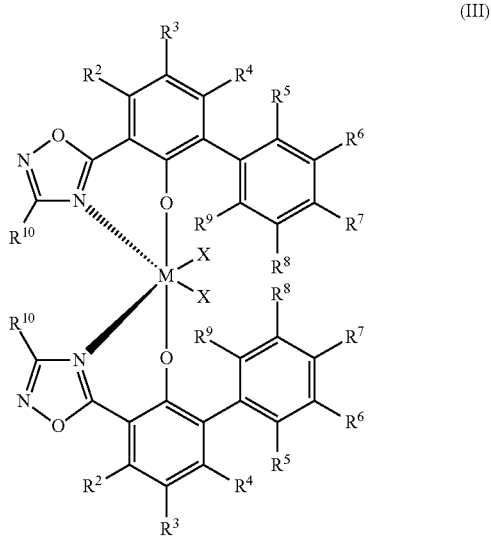

where M, X, and $R^2$ through $R^{10}$ are defined as above.

In other non-limiting embodiments, the catalyst compounds comprising an oxadiazole compound may be represented by the following structure (IV):

(IV)

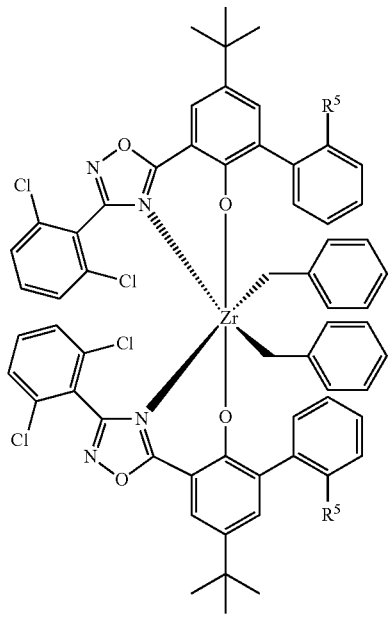

-continued (VI)

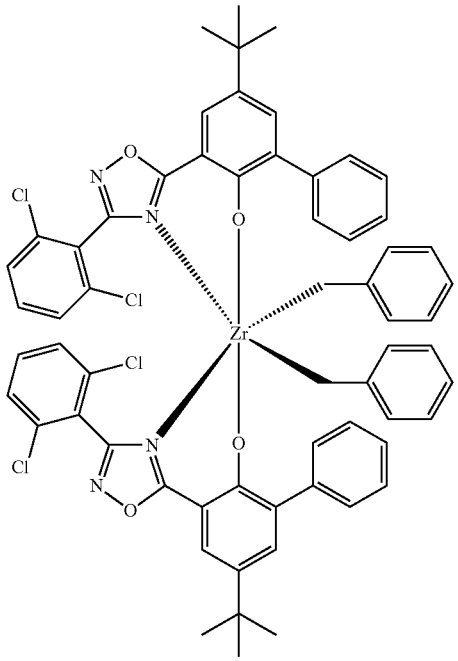

where each $R^5$ is independently selected from the group consisting of hydride and $C_1$ to $C_4$ alkyl. In some embodiments, at least one $R^5$ is hydrogen, or in some embodiments both $R^5$s are hydrogen. In some embodiments, at least one $R^5$ is a methyl, or in some embodiments both each $R^5$s are methyl.

In some embodiments, the catalyst compounds comprising an oxadiazole compound and having essentially no hydrogen response may include a phenoloxadiazole complex having structures (V) and/or (VI), (V)

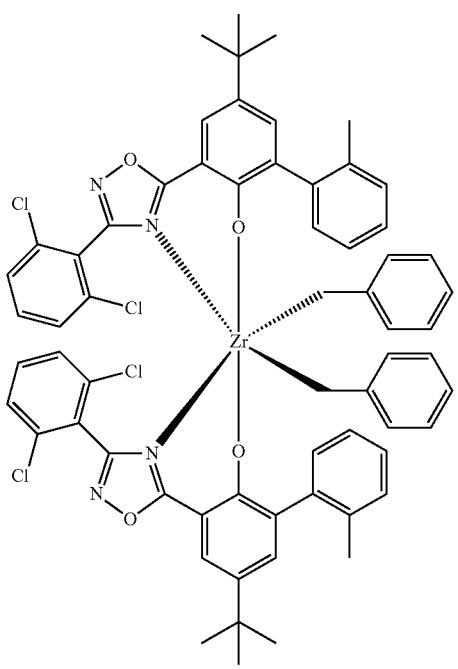

Preparation of Mixed Catalyst System

The catalyst compounds described above comprising an oxadiazole compound may be combined with one or more additional catalyst compounds, as described further below, to form a catalyst system according to embodiments disclosed herein. Each of the catalyst compounds may be supported on a common support, may be unsupported, or one or more of the catalyst compounds may be supported or unsupported.

When the two or more catalyst compounds are used to form a catalyst systems, the two or more catalyst compounds can be added together in the desired ratio when combined, contacted with an activator, or contacted with a support or a supported activator. The catalyst compounds may be added to the mixture sequentially or at the same time.

In some embodiments, more complex procedures are possible, such as addition of a first catalyst compound to a slurry including a support or a supported activator mixture for a specified reaction time t, followed by the addition of the second catalyst compound solution, mixed for another specified time x, after which the mixture may be recovered for use in a polymerization reactor, such as by spray drying. Lastly, another additive, such as 1-hexene in about 10 vol % can be present in the mixture prior to the addition of the first catalyst compound. The catalyst compound having a negligible hydrogen response may be added as the first, last or second, third, etc. catalyst compound in various embodiments.

In some embodiments, a first catalyst compound may be supported via contact with a support material for a reaction time. The resulting supported catalyst composition may then be mixed with mineral oil to form a slurry, which may or may not include an activator. The slurry may then be admixed with a second catalyst compound prior to introduction of the resulting mixed catalyst system to a polymerization reactor. The catalyst compounds may be admixed at any point prior to introduction to the reactor, such as in a polymerization feed vessel or in-line in a catalyst delivery system.

In some embodiments, a mixed catalyst system may be formed by combining a HMW catalyst compound (a catalyst compound useful for producing a high molecular weight polymer fraction) with a support and activator, desirably in a first diluent such as an alkane or toluene, to produce a supported, activated HMW catalyst compound. The supported activated HMW catalyst compound, either isolated from the first diluent or not, is then combined in one embodiment with a high viscosity diluent such as mineral or silicon oil, or an alkane diluent comprising from 5 to 99 wt % mineral or silicon oil to form a slurry of the supported HMW catalyst compound, followed by, or simultaneous to combining with a LMW catalyst compound (a catalyst compound useful for producing a low molecular weight polymer fraction), either in a diluent or as the dry solid compound, to form a supported activated mixed catalyst system ("mixed catalyst system"). The mixed catalyst system thus produced may be a supported and activated HMW catalyst compound in a slurry, the slurry comprising mineral or silicon oil, with a LMW catalyst compound that is not supported and not combined with additional activator, where the LMW catalyst compound may or may not be partially or completely soluble in the slurry. In one embodiment, the diluent consists of mineral oil.

Mineral oil, or "high viscosity diluents," as used herein refers to petroleum hydrocarbons and mixtures of hydrocarbons that may include aliphatic, aromatic, and/or paraffinic components that are liquids at 23° C. and above, and typically have a molecular weight of at least 300 amu to 500 amu or more, and a viscosity at 40° C. of from 40 to 300 cSt or greater, or from 50 to 200 cSt in a particular embodiment. The term "mineral oil" includes synthetic oils and other commercial oils such as paraffin oils sold under such names as KAYDOL™, ISOPAR™, STRUKTOL™, SUNPAR™ oils, PARAPOL™ oils, and other synthetic oils or liquid polymers, polybutenes, refined naphthenic hydrocarbons, refined paraffins known in the art, such as disclosed in BLUE BOOK 2001, MATERIALS, COMPOUNDING INGREDIENTS, MACHINERY AND SERVICES FOR RUBBER 189 247 (J. H. Lippincott, D. R. Smith, K. Kish & B. Gordon eds. Lippincott & Peto Inc. 2001). Preferred mineral and silicon oils useful in the present invention are those that exclude moieties that are reactive with metallocene catalysts, examples of which include hydroxyl and carboxyl groups.

In one embodiment, the diluent is a blend of a mineral or silicon oil and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof In another embodiment, the diluent is a blend of a mineral oil and a hydrocarbon selected from the group consisting of $C_1$ to $C_{10}$ alkanes, $C_6$ to $C_{20}$ aromatic hydrocarbons, $C_7$ to $C_{21}$ alkyl-substituted hydrocarbons, and mixtures thereof When the mineral oil is a blend, the diluent comprises from 5 to 99 wt %, by weight of the diluent, of mineral oil. In yet another embodiment, the diluent consists of mineral oil.

In one embodiment, the HMW catalyst compound is combined with an activator and a first diluent to form a catalyst slurry that is then preferably combined with a support material. Until such contact is made, the support particles are preferably not previously activated. The HMW catalyst compound can be in any desirable form such as a dry powder, suspension in a diluent, solution in a diluent, liquid, etc. The catalyst slurry and support particles are then mixed thoroughly, in one embodiment at an elevated temperature, so that both the HMW catalyst compound and the activator are deposited on the support particles to form a support slurry. By following the procedures described herein for forming the mixed catalyst, to provide an activated, supported mixed catalyst system, a polymer, particularly a bimodal polyethylene, can be produced with a desirable combination of density, melt flow ratio and melt strength.

After the HMW catalyst compound and activator are deposited on the support, a LMW catalyst compound is then combined with the supported HMC, wherein the LMW is combined with a diluent comprising mineral or silicon oil by any suitable means either before, simultaneously to, or after contacting the LMC with the supported HMW catalyst compound. In one embodiment, the HMW catalyst compound is isolated form the first diluent to a dry state before combining with the LMW catalyst compound. Preferably, the LMW catalyst compound is not activated, that is, not combined with any activator, before being combined with the supported HMW catalyst compound. The resulting solids slurry (including both the supported HMW and LMW catalyst compounds) is then preferably mixed thoroughly at an elevated temperature.

A wide range of mixing temperatures may be used at various stages of making the mixed catalyst system. For example, in a specific embodiment, when the HMW catalyst compound and at least one activator such as methylaluminoxane are combined with a first diluent to form a mixture, the mixture is preferably heated to a first temperature of from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

Next, that mixture is preferably combined with a support to provide a first support slurry. The support can be heated, or dehydrated if desired, prior to combining. In one or more embodiments, the first support slurry is mixed at a temperature greater than 50° C., preferably greater than 70° C., more preferably greater than 80° C. and most preferably greater than 85° C., for a period of time from 30 seconds to 12 hours, preferably from 1 minute to 6 hours, more preferably from 10 minutes to 4 hours, and most preferably from 30 minutes to 3 hours. Preferably, the support slurry is mixed for a time sufficient to provide a collection of activated support particles that have the HMW catalyst compound deposited thereto. The first diluent can then be removed from the first support slurry to provide a dried supported HMW catalyst compound. For example, the first diluent can be removed under vacuum or by nitrogen purge.

Next, the LMW catalyst compound is combined with the activated HMW catalyst compound in the presence of a diluent comprising mineral or silicon oil in one embodiment. Preferably, the LMW catalyst compound is added in a molar ratio to the HMW catalyst compound in the range from 2:1 to 1:3. Most preferably, the molar ratio is approximately 1:1. The resultant slurry (or first support slurry) is preferably heated to a first temperature from 25° C. to 150° C., preferably from 50° C. to 125° C., more preferably from 75° C. to 100° C., most preferably from 80° C. to 100° C. and stirred for a period of time from 30 seconds to 12 hours, preferably from 1 minute to 6 hours, more preferably from 10 minutes to 4 hours, and most preferably from 30 minutes to 3 hours.

One or more additional catalysts may be introduced to the dried supported HMW catalyst compound at the same time or at a later time as the LMW catalyst compound is added in one embodiment. Additional activator may also be added in one embodiment. In a particular embodiment, no additional activator is added.

The first diluent is an aromatic or alkane, preferably hydrocarbon diluent having a boiling point of less than 200° C. such as toluene, xylene, hexane, etc., may be removed from the supported HMW catalyst compound under vacuum or by nitrogen purge to provide a supported mixed catalyst system.

Even after addition of the oil and/or the LMW (or other) catalyst compound, it may be desirable to treat the slurry to further remove any remaining solvents such as toluene. This can be accomplished by an N₂ purge or vacuum, for example. Depending upon the level of mineral oil added, the resultant mixed catalyst system may still be a slurry or may be a free flowing powder that comprises an amount of mineral oil. Thus, the mixed catalyst system, while a slurry of solids in mineral oil in one embodiment, may take any physical form such as a free flowing solid. For example, the mixed catalyst system may ranges from 1 to 99 wt % solids content by weight of the mixed catalyst system (mineral oil, support, all catalyst compounds and activator(s)) in one embodiment.

The molar ratio of the metal or metalloid activator to the metal in each of the supported metallocene catalyst compounds is in the range of between 0.3:1 to 1000:1, preferably 20:1 to 800:1, and most preferably 50:1 to 500:1. Where the activator is an ionizing activator such as those based on the anion tetrakis(pentafluorophenyl)borate, the molar ratio of the metal or metalloid of the activator component to the metal component of the metallocene catalyst is preferably in the range of between 0.3:1 to 3:1.

Additional Catalyst Compounds

In combination with the above-described catalyst compounds having a nil hydrogen response, any type of polymerization catalyst compounds may be used to form catalyst systems according to embodiments disclosed herein, including liquid-form catalysts, solid catalysts, and heterogeneous or supported catalysts, among others, and may be fed to the reactor as a liquid, slurry (liquid/solid mixture), or as a solid (typically gas transported). Such catalyst compounds may be used to form catalyst systems according to embodiments disclosed herein, and/or may be used in addition to catalyst systems according to embodiments disclosed herein for use in producing polymers.

Liquid-form catalysts useful in embodiments disclosed herein should be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art.

Catalyst compounds useful in embodiments disclosed herein may include, broadly, transition metal catalysts and metallocene catalysts. More specifically, catalyst compounds useful in embodiments disclosed herein may include:

A. Ziegler-Natta catalysts, including titanium based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium based catalysts, such as those described in U.S. Pat. Nos. 3,709,853; 3,709,954; and 4,077,904.

C. Vanadium based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. Especially useful are carboxylates, alcoholates, acetylacetonates, halides (including ether and alcohol complexes of neodymium trichloride), and allyl derivatives of such metals. In various embodiments, neodymium compounds, particularly neodymium neodecanoate, octanoate, and versatate, are particularly useful rare earth metal catalysts. Rare earth catalysts may be used, for example, to polymerize butadiene or isoprene.

I. Group 15 atom and metal containing catalysts described in, for example, EP 0 893 454 A1, U.S. Pat. No. 5,889,128 and the references cited in U.S. Pat. No. 5,889,128.

J. Any combination of the above to form a mixed catalyst system.

In some embodiments, a catalyst compound comprising an oxadiazole compound and having essentially no hydrogen response, as described above, may be combined with a metallocene to form a catalyst system according to embodiments disclosed herein. Metallocene catalyst compounds are generally described throughout, for example, 1 & 2 METALLOCENE-BASED POLYOLEFINS (John Scheirs & W. Kaminsky eds., John Wiley & Sons, Ltd. 2000); G. G. Hlalky in 181 COORDINATION CHEM. REV. 243-296 (1999) and in particular, for use in the synthesis of polyethylene in 1 METALLOCENE-BASED POLYOLEFINS 261-377 (2000).

In some embodiments, the metallocene catalyst compounds may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. These compounds may also be referred to herein as "metallocenes" or "metallocene catalyst components".

As mentioned above, metallocenes useful in embodiments disclosed herein may include those described in U.S. Pat. Nos. 6,933,258 and 6,894,131. Other useful metallocenes are described in, for example, U.S. Pat. Nos. 7,582,711, 5,017,714, 5,055,438, 5,096,867, 5,198,401, 5,229,478, 5,264,405, 5,278,119, 5,324,800, 5,384,299, 5,408,017, 5,491,207, 5,621,126, 6,207,606, 6,245,868, 6,300,436, 6,306,984, 6,391,819, 6,472,342, 6,492,472, 6,605,560, 6,608,153, 6,734,267, 6,936,226, and 6,943,134, among others.

In particular embodiments, metallocenes useful in embodiments disclosed herein may be represented by the following structures (VII, VIII, and IX):

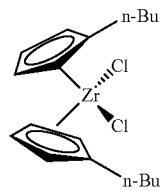

(VII)

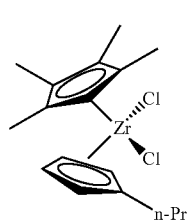

(VIII)

-continued

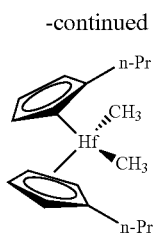
(IX)

In some embodiments, a catalyst compound comprising an oxadiazole compound and having essentially no hydrogen response, as described above, may be combined with a Group 15 atom and metal containing catalyst compound to form a catalyst system according to embodiments disclosed herein.

"Group 15 Atom and Metal Containing Catalyst" or "Group 15-containing catalyst compound, or "Group 15-containing catalyst components," as used interchangeably and referred to herein, include Group 3 to Group 12 metal complexes, where the metal is 2 to 4 coordinate, and the coordinating moiety or moieties include at least two Group 15 atoms, and up to four Group 15 atoms. In one embodiment, the Group 15-containing catalyst component is a complex of a Group 4 metal and from one to four ligands such that the Group 4 metal is at least 2 coordinate, the coordinating moiety or moieties including at least two nitrogens. Representative Group 15-containing catalyst compounds are disclosed in, for example, WO 98/46651, WO 99/01460; EP A1 0 893,454; EP A1 0 894 005; and U.S. Pat. Nos. 5,318,935, 5,889,128, 6,333,389, 6,271,325, 6,274,684, 6,300,438, 6,482,904, and 6,858,689, among others. In some embodiments, the Group 15-containing catalyst may include at least one fluoride or fluorine containing leaving group.

In some embodiments, the Group 15 containing metal catalyst compound, may be represented by the structure (X) or (XI):

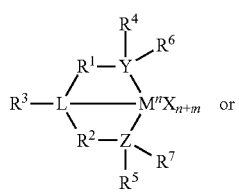
(X)

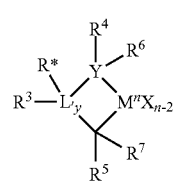
(XI)

wherein: M is a Group 3 to 12 transition metal or a Group 13 or 14 main group metal, preferably a Group 4, 5, or 6 metal, and more preferably a Group 4 metal, and most preferably zirconium, titanium or hafnium; each X is independently a leaving group, preferably, an anionic leaving group, and more preferably hydrogen, a hydrocarbyl group, a heteroatom or a halogen, and most preferably an alkyl; y is 0 or 1 (when y is 0 group L' is absent); n is the oxidation state of M, preferably +3, +4, or +5, and more preferably +4; m is the formal charge of the YLZ or the YL'Z ligand, preferably 0, −1, −2 or −3, and more preferably −2; L is a Group 15 or 16 element, preferably nitrogen; L' is a Group 15 or 16 element or Group 14 containing group, preferably carbon, silicon or germanium; Y is a Group 15 element, preferably nitrogen or phosphorus, and more preferably nitrogen; Z is a Group 15 element, preferably nitrogen or phosphorus, and more preferably nitrogen; $R^1$ and $R^2$ are independently a $C_1$ to $C_1$ hydrocarbon group, a heteroatom containing group having up to twenty carbon atoms, silicon, germanium, tin, lead, or phosphorus, preferably a $C_2$ to $C_{20}$ alkyl, aryl or aralkyl group, more preferably a linear, branched or cyclic $C_2$ to $C_{20}$ alkyl group, most preferably a $C_2$ to $C_6$ hydrocarbon group; $R^3$ is absent or a hydrocarbon group, hydrogen, a halogen, a heteroatom containing group, preferably a linear, cyclic or branched alkyl group having 1 to 20 carbon atoms, more preferably $R^3$ is absent, hydrogen or an alkyl group, and most preferably hydrogen; $R^4$ and $R^5$ are independently an alkyl group, an aryl group, substituted aryl group, a cyclic alkyl group, a substituted cyclic alkyl group, a cyclic aralkyl group, a substituted cyclic aralkyl group or multiple ring system, preferably having up to 20 carbon atoms, more preferably between 3 and 10 carbon atoms, and even more preferably a $C_1$ to $C_{20}$ hydrocarbon group, a $C_1$ to $C_{20}$ aryl group or a $C_1$ to $C_{20}$ aralkyl group, or a heteroatom containing group, for example $PR_3$, where R is an alkyl group, $R^1$ and $R^2$ may be interconnected to each other, and/or $R^4$ and $R^5$ may be interconnected to each other; $R^6$ and $R^7$ are independently absent, or hydrogen, an alkyl group, halogen, heteroatom or a hydrocarbyl group, preferably a linear, cyclic or branched alkyl group having 1 to 20 carbon atoms, more preferably absent; and R* is absent, or is hydrogen, a Group 14 atom containing group, a halogen, a heteroatom containing group.

By "formal charge of the YLZ or YL'Z ligand" it is meant the charge of the entire ligand absent the metal and the leaving groups X.

By "$R^1$ and $R^2$ may also be interconnected" it is meant that $R^1$ and $R^2$ may be directly bound to each other or may be bound to each other through other groups. By "$R^4$ and $R^5$ may also be interconnected" it is meant that $R^4$ and $R^5$ may be directly bound to each other or may be bound to each other through other groups.

An alkyl group may be a linear, branched alkyl radicals, or alkenyl radicals, alkynyl radicals, cycloalkyl radicals or aryl radicals, acyl radicals, aroyl radicals, alkoxy radicals, aryloxy radicals, alkylthio radicals, dialkylamino radicals, alkoxycarbonyl radicals, aryloxycarbonyl radicals, carbomoyl radicals, alkyl- or dialkyl-carbamoyl radicals, acyloxy radicals, acylamino radicals, aroylamino radicals, straight, branched or cyclic, alkylene radicals, or combination thereof An aralkyl group is defined to be a substituted aryl group.

In some embodiment $R^4$ and $R^5$ are independently a group represented by the following structure (XII):

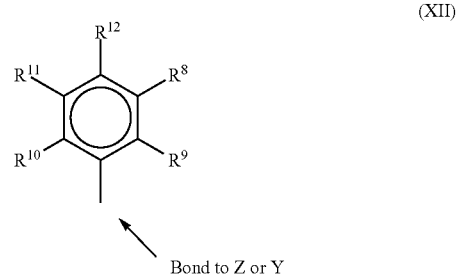
(XII)

wherein $R^8$ to $R^{12}$ are each independently hydrogen, a $C_1$ to $C_{40}$ alkyl group, a halide, a heteroatom, a heteroatom containing group containing up to 40 carbon atoms, preferably a $C_1$ to $C_{20}$ linear or branched alkyl group, preferably a methyl, ethyl, propyl or butyl group, any two R groups may form a cyclic group and/or a heterocyclic group. The cyclic groups may be aromatic. In a preferred embodiment $R^9$, $R^{10}$ and $R^{12}$ are independently a methyl, ethyl, propyl or butyl group (including all isomers), in a preferred embodiment $R^9$, $R^{10}$ and $R^{12}$ are methyl groups, and $R^8$ and $R^{11}$ are hydrogen.

In some embodiments, $R^4$ and $R^5$ are both a group represented by the following structure (XIII):

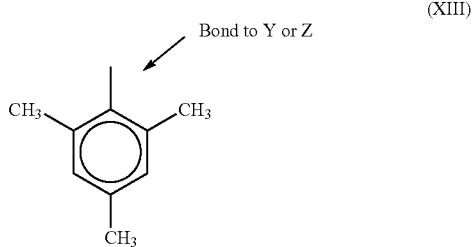

(XIII)

In this embodiment, M is a Group 4 metal, preferably zirconium, titanium or hafnium, and even more preferably zirconium; each of L, Y, and Z is nitrogen; each of $R^1$ and $R^2$ is —$CH_2$—$CH_2$—; $R^3$ is hydrogen; and $R^6$ and $R^7$ are absent.

In preferred embodiments, the Group 15-containing catalyst compounds may be represented by the following structure (XIV):

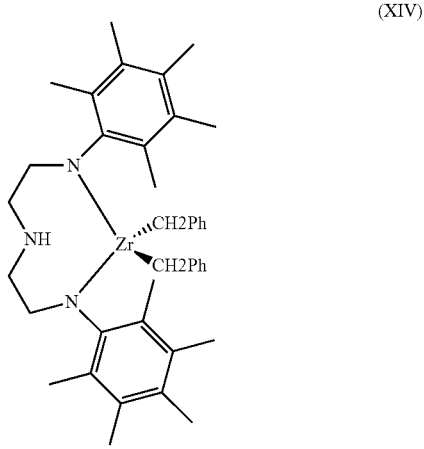

(XIV)

Catalyst systems according to embodiments disclosed herein containing two or more catalyst compounds, including an oxadiazole-containing catalyst compound having essentially no hydrogen response in combination with one or more additional catalyst compounds as described above, may be used for producing polyolefins having essentially unimodal, bimodal or multimodal molecular weight distributions.

In some embodiments, catalyst systems according to embodiments disclosed herein may include (i) an oxadiazole-containing catalyst compound having essentially no hydrogen response, and (ii) at least one of a metallocene catalyst compound and a Group 15-containing catalyst compound.

For example, in some embodiments, catalyst systems according to embodiments disclosed herein may include (i) an oxadiazole-containing catalyst compound having essentially no hydrogen response as represented by any one of structures (III)-(VI), preferably structure (V) or (VI), and (ii) at least one metallocene catalyst compound represented by any one of structures (VII), (VIII), or (IX). In other embodiments, catalyst systems according to embodiments disclosed herein may include (i) an oxadiazole-containing catalyst compound having essentially no hydrogen response as represented by any one of structures (III)-(VI), preferably structure (V) or (VI), and (ii) at least one Group 15-containing catalyst compound, such as may be represented by any one of structures (X)-(XIV), preferably structure (XIV).

In other embodiments, catalyst systems according to embodiments disclosed herein may include (i) an oxadiazole-containing catalyst compound having essentially no hydrogen response as represented by any one of structures (III)-(VI), preferably structure (V) or (VI), (ii)(a) at least one metallocene catalyst compound represented by any one of structures (VII), (VIII), or (IX), and (ii)(b) a Group 15-containing catalyst compound, such as may be represented by any one of structures (X)-(XIV), preferably structure (X).

The amount of each catalyst compound present in the catalyst systems disclosed herein may be varied within a range. The amount of each catalyst component used in a particular catalyst system may depend on the polymer or range of polymers to be produced, as well as the reaction parameters used to produce the polymer or the range of polymers, including but not limited to reactor temperature, reactor pressure, hydrogen concentration, and comonomer concentration.

In some embodiments, the molar ratio of catalyst compound (i) to catalyst compound (ii), each as defined above, may be in the range of 1:99 to 99:1. In some embodiments, catalyst compound (i) may be present in an amount between about 1 and 80 mol %, or in the range of 1 to 50 mol %, or in the range of 1 to 35 mol %, based on a total amount of catalyst compounds (i) and (ii).

In some embodiments, the metallocene catalyst compound and/or the Group 15-containing catalyst compound may be selected to produce a polymer having a molecular weight greater or less than the molecular weight of the polymer produced by the oxadiazole-containing catalyst compound having essentially no hydrogen response.

Where three or more catalyst compounds are used to form a catalyst system according to some embodiments disclosed herein, catalyst compound (i) may be combined with a first catalyst compound (ii) selected to produce a polymer having a higher molecular weight (a high molecular weight-producing catalyst), and a second catalyst compound (ii) selected to produce a polymer having a lower molecular weight (a low molecular weight-producing catalyst) than the molecular weight of the polymer produced by the oxadiazole-containing catalyst compound (an intermediate molecular weight-producing catalyst). The low molecular weight catalyst is generally present in an amount between about 1 and 80 mol %, based on a total amount of catalyst compounds (i) and (ii); preferably in an amount greater than that of the high molecular weight catalyst. Generally, the high molecular weight catalyst compound is present in a catalyst system in an amount in a range of from about 1 to about 50 mol %, or in the range of from 1 to 25 mol %, or in the range of from 5 to 20 mol %, of said low molecular weight catalyst compound. The intermediate molecular weight catalyst compound is preferably present in a range of from about 1 to about 50 mol %, or in the range of from 1 to 20 mol %, of said low molecular weight catalyst compound. For example, in the case of one high and one low molecular weight catalyst, the mol % of the high molecular weight catalyst may be calculated from the equation: 100(moles of high molecular weight catalyst)/(moles of low molecular weight catalyst+moles of high molecular weight catalyst).

As mentioned above, different catalysts have different hydrogen responses, thus resulting in mixed catalyst systems behaving in relatively unpredictable ways to hydrogen concentration during polymerization. In some cases, an increase in hydrogen may increase the activity of one catalyst while decreasing the activity of another catalyst, and vise-versa. Thus, processes which utilize hydrogen require rigorous characterization of the system to determine the proper amount of hydrogen required for a particular outcome.

However, it has been unexpectedly discovered that embodiments of the oxadiazole-containing catalyst compounds disclosed herein have essentially no hydrogen response, and the molecular weight of the resulting polymer produced is not influenced significantly by the hydrogen concentration in the reactor. In particular, the catalysts represented by structures (III)-(VI), particularly structures (V) and (VI), have essentially no hydrogen response. Applicants have discovered that the molecular weight properties, in particular, the relative proportions of the various components produced by the catalyst systems disclosed herein may be controlled in a predictable way and thus the physical properties of the resultant polymers may be manipulated in a predictable way by simply controlling the hydrogen concentration during polymerization. The "predictability" being the result of the hydrogen concentration not effecting the polymerization of at least one of the catalysts so that one or two of the catalyst may be manipulated through hydrogen concentration while the remaining catalyst functions according to the other conditions of the polymerization.

Due to the predictable behavior of the resulting mixed catalyst systems disclosed herein, the range of polymers that may be produced range from essentially unimodal to bimodal or multimodal molecular weight distributions, as described above.

Activators

The polymerization catalyst compounds, prepared above, are typically combined with an activator compound to yield compounds having a vacant coordination site that will coordinate, insert, and polymerize olefin(s). For the purposes of embodiments disclosed herein and appended claims, the term "activator" is defined to be any compound which can activate any one of the catalyst compounds described above by converting the neutral catalyst compound to a catalytically active catalyst compound cation. Non-limiting activators, for example, include alumoxanes, aluminum alkyls, ionizing activators, which may be neutral or ionic, and conventional-type cocatalysts. Suitable activators are described in U.S. Patent Application Publication No. 2008/045676.

Support Materials

The polymerization catalyst compounds disclosed herein may be combined with a support material or carrier, or with a supported activator. For example, the catalyst compound is deposited on, contacted with, vaporized with, bonded to, or incorporated within, adsorbed or absorbed in, or on, a support or carrier.

The support material is any of the conventional support materials. Preferably the supported material is a porous support material, for example, talc, inorganic oxides and inorganic chlorides. Other support materials include resinous support materials such as polystyrene, functionalized or crosslinked organic supports, such as polystyrene divinyl benzene polyolefins or polymeric compounds, zeolites, clays, or any other organic or inorganic support material and the like, or mixtures thereof.

The preferred support materials are inorganic oxides that include those Group 2, 3, 4, 5, 13 or 14 metal oxides. The preferred supports include silica, fumed silica, alumina (WO 99/60033), silica-alumina and mixtures thereof Other useful supports include magnesia, titania, zirconia, magnesium chloride (U.S. Pat. No. 5,965,477), montmorillonite (European Patent EP-B1 0 511 665), phyllosilicate, zeolites, talc, clays (U.S. Pat. No. 6,034,187) and the like. Also, combinations of these support materials may be used, for example, silica-chromium, silica-alumina, silica-titania and the like. Additional support materials may include those porous acrylic polymers described in EP 0 767 184 B1, which is incorporated herein by reference. Other support materials include nanocomposites as described in PCT WO 99/47598, aerogels as described in WO 99/48605, spherulites as described in U.S. Pat. No. 5,972,510 and polymeric beads as described in WO 99/50311, which are all herein incorporated by reference. A preferred support is fumed silica available under the trade name Cabosil™ TS-610, available from Cabot Corporation. Fumed silica is typically a silica with particles 7 to 30 nanometers in size that has been treated with dimethylsilyldichloride such that a majority of the surface hydroxyl groups are capped.

The support material may have a surface area in the range of from about 10 to about 700 $m^2/g$, or in the range of from about 50 to about 1000 $m^2/g$, or in the range is from about 100 to about 400 $m^2/g$, or in the range of about 200 to about 600 $m^2/g$, or in the range of about 245 to about 375 $m^2/g$, or in the range of 410 to about 620 $m^2/g$, or in the range of about 390 to about 590 $m^2/g$.

The support material may have a pore volume in the range of from about 0.1 to about 4.0 cc/g, or from about 0.5 to about 3.5 cc/g, or from about 0.8 to about 3.0 cc/g. In some embodiments, the support material may have a pore volume in the range of from 0.5 to about 6.0 cc/g, or from about 1.1 to about 1.8 cc/g, or from about 2.4 to about 3.7 cc/g, or from about 0.9 to about 1.4 cc/g.

The support material may have an average particle size in the range of from about 5 to about 500 microns, or from about 10 to about 300 microns, or from about 5 to about 100 microns.

It is preferred that the support material, most preferably an inorganic oxide, has a surface area in the range of from about 10 to about 700 $m^2/g$, pore volume in the range of from about 0.1 to about 4.0 cc/g and average particle size in the range of from about 5 to about 500 microns. More preferably, the surface area of the support material is in the range of from about 50 to about 1000 $m^2/g$, pore volume of from about 0.5 to about 3.5 cc/g and average particle size of from about 10 to about 300 microns. Most preferably the surface area of the support material is in the range is from about 100 to about 400 $m^2/g$, pore volume from about 0.8 to about 3.0 cc/g and average particle size is from about 5 to about 100 microns. In some embodiments, the support may have a pore volume of about 0.5 to about 6.0 $cm^3/g$ and a surface area of about 200 to about 600 $m^2/g$. In other embodiments, the support may have a pore volume of about 1.1 to about 1.8 $cm^3/g$ and a surface area of about 245 to about 375 $m^2/g$. In some other embodiments, the support may have a pore volume of about 2.4 to about 3.7 $cm^3/g$ and a surface area of about 410 to about 620 $m^2/g$. In yet other embodiments, the support may have a pore volume of about 0.9 to about 1.4 $cm^3/g$ and a surface area of about 390 to about 590 $m^2/g$. Each of the above properties may be measured using conventional techniques as known in the art.

In some embodiments, the support and activator may be as described in US2009/240010, WO2009/117128, WO2009/045215, US2007/197716, and/or US2005/288178.

Polymerization Process

Embodiments for producing polyolefin polymer disclosed herein may employ any suitable process for the polymerization of olefins, including any suspension, solution, slurry, or gas phase process, using known equipment and reaction conditions, and are not limited to any specific type of polymerization system. Generally, olefin polymerization temperatures may range from about 0 to about 300° C. at atmospheric, sub-atmospheric, or super-atmospheric pressures. In particular, slurry or solution polymerization systems may employ sub-atmospheric, or alternatively, super-atmospheric pressures, and temperatures in the range of about 40 to about 300° C.

In some embodiments, liquid phase polymerization systems such as those described in U.S. Pat. No. 3,324,095, may be used. Liquid phase polymerization systems generally comprise a reactor to which olefin monomers and catalyst compositions are added. The reactor contains a liquid reaction medium which may dissolve or suspend the polyolefin product. This liquid reaction medium may comprise an inert liquid hydrocarbon which is non-reactive under the polymerization conditions employed, the bulk liquid monomer, or a mixture thereof. Although such an inert liquid hydrocarbon may not function as a solvent for the catalyst composition or the polymer obtained by the process, it usually serves as solvent for the monomers used in the polymerization. Inert liquid hydrocarbons suitable for this purpose may include isobutane, isopentane, hexane, cyclohexane, heptane, octane, benzene, toluene, and mixtures and isomers thereof Reactive contact between the olefin monomer and the catalyst composition may be maintained by constant stirring or agitation. The liquid reaction medium which contains the olefin polymer product and unreacted olefin monomer is withdrawn from the reactor continuously. The olefin polymer product is separated, and the unreacted olefin monomer and liquid reaction medium are typically recycled and fed back into the reactor.

Embodiments for producing polyolefin polymer disclosed herein may also employ a gas phase polymerization process utilizing a fluidized bed reactor. This type reactor, and means for operating the reactor, are well known and completely described in, for example, U.S. Pat. Nos. 3,709,853; 4,003,712; 4,011,382; 4,302,566; 4,543,399; 4,882,400; 5,352,749; 5,541,270; and EP-A-0 802 202. These patents disclose gas phase polymerization processes wherein the polymerization medium is either mechanically agitated or fluidized by the continuous flow of the gaseous monomer and diluent.

Other gas phase processes contemplated by the process of the invention include series or multistage polymerization processes. Also gas phase processes contemplated by the invention include those described in U.S. Pat. Nos. 5,627,242, 5,665,818 and 5,677,375, and European publications EP-A-0 794 200 EP-B1-0 649 992, EP-A-0 802 202 and EP-B-634.

In general, the polymerization process of the present invention may be a continuous gas phase process, such as a fluid bed process. A fluid bed reactor for use in the process of the present invention typically has a reaction zone and a so-called velocity reduction zone (disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

The process of the present invention is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment; ethylene and a comonomer comprising from 3 to 12 carbon atoms in another embodiment; ethylene and a comonomer comprising from 4 to 10 carbon atoms in another embodiment; and ethylene and a comonomer comprising from 4 to 8 carbon atoms in another embodiment.

In embodiments, polyethylenes may be prepared by the process of the present invention. Such polyethylenes may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

Other monomers useful in the process described herein include ethylenically unsaturated monomers, diolefins having 4 to 18 carbon atoms, conjugated or non-conjugated dienes, polyenes, vinyl monomers and cyclic olefins. Non-limiting monomers useful in the invention may include norbornene, norbornadiene, isobutylene, isoprene, vinylbenzocyclobutane, styrenes, alkyl substituted styrene, ethylidene norbornene, dicyclopentadiene and cyclopentene. In another embodiment of the process described herein, ethylene or propylene may be polymerized with at least two different comonomers, optionally one of which may be a diene, to form a terpolymer.

In one embodiment, the content of the alpha-olefin incorporated into the copolymer may be no greater than 30 mol % in total; from 3 to 20 mol % in other embodiments. The term "polyethylene" when used herein is used generically to refer to any or all of the polymers comprising ethylene described above.

In another family of embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1, 1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total; from 3 to 35 mol % in other embodiments.

Hydrogen gas is often used in olefin polymerization to control the final properties of the polyolefin. Using the catalyst system described herein, it is known that increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization can be expressed as a mole ratio relative to the total polymerizable monomer, for example, ethylene, or a blend of ethylene and hexene or propylene. The amount of hydrogen used in the polymerization processes of the present invention is an amount necessary to achieve the desired MFI or MI of the final polyolefin resin.

The one or more reactors in a gas phase or fluidized bed polymerization process may have a pressure ranging from about 0.7 to about 70 bar (about 10 to 1000 psia); or in the range of from about 14 to about 42 bar (about 200 to about 600 psia). The one or more reactors may have a temperature ranging from about 10° C. to about 150° C.; or in the range of from about 40° C. to about 125° C. In one embodiment, the reactor temperature may be operated at the highest feasible temperature taking into account the sintering temperature of the polymer within the reactor. The superficial gas velocity in the one or more reactors may range from about 0.2 to 1.1 meters/second (0.7 to 3.5 feet/second); or from about 0.3 to 0.8 meters/second (1.0 to 2.7 feet/second).

In some embodiments, the polymerization process is a continuous gas phase process that includes the steps of: (a) introducing a recycle stream (including ethylene and alpha olefin monomers) into the reactor; (b) introducing the catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In an embodiment, one or more olefins, $C_2$ to $C_{30}$ olefins or alpha-olefins, including ethylene or propylene or combinations thereof, may be prepolymerized in the presence of the catalyst systems described above prior to the main polymerization. The prepolymerization may be carried out batch-wise or continuously in gas, solution or slurry phase, including at elevated pressures. The prepolymerization can take place with any olefin monomer or combination and/or in the presence of any molecular weight controlling agent such as hydrogen. For examples of prepolymerization procedures, see U.S. Pat. Nos. 4,748,221, 4,789,359, 4,923,833, 4,921,825, 5,283,278 and 5,705,578 and European publication EP-B-0279 863 and WO 97/44371.

The present invention is not limited to any specific type of fluidized or gas phase polymerization reaction and can be carried out in a single reactor or multiple reactors such as two or more reactors in series. In addition to well-known conventional gas phase polymerization processes, it is within the scope of the present invention that "condensing mode," including the "induced condensing mode" and "liquid monomer" operation of a gas phase polymerization may be used.

For example, the process may employ a condensing mode polymerization, such as those disclosed in U.S. Pat. Nos. 4,543,399; 4,588,790; 4,994,534; 5,352,749; 5,462,999; and 6,489,408. Condensing mode processes may be used to achieve higher cooling capacities and, hence, higher reactor productivity. In addition to condensable fluids of the polymerization process itself, other condensable fluids inert to the polymerization may be introduced to induce a condensing mode operation, such as by the processes described in U.S. Pat. No. 5,436,304.

Other embodiments of the preset invention may also use a liquid monomer polymerization mode such as those disclosed in U.S. Pat. No. 5,453,471; U.S. Ser. No. 08/510,375; PCT 95/09826 (US) and PCT 95/09827 (US). When operating in the liquid monomer mode, liquid can be present throughout the entire polymer bed provided that the liquid monomer present in the bed is adsorbed on or in solid particulate matter present in the bed, such as polymer being produced or inert particulate material (e.g., carbon black, silica, clay, talc, and mixtures thereof), so long as there is no substantial amount of free liquid monomer present. Operating in a liquid monomer mode may also make it possible to produce polymers in a gas phase reactor using monomers having condensation temperatures much higher than the temperatures at which conventional polyolefins are produced.

Processes disclosed herein may optionally use inert particulate materials as fluidization aids. These inert particulate materials can include carbon black, silica, talc, and clays, as well as inert polymeric materials. Carbon black, for example, has a primary particle size of about 10 to about 100 nanometers, an average size of aggregate of about 0.1 to about 30 microns, and a specific surface area from about 30 to about 1500 $m^2/g$. Silica has a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80% in some embodiments, and from about 5 to about 50% in other embodiments, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those skilled in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of those skilled in the art. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

In one embodiment of the process of the invention, the gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

In a family of embodiments, the reactors disclosed herein are capable of producing greater than 500 lbs of polymer per hour (227 Kg/hr) to about 220,000 lbs/hr (100,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 100,000 lbs/hr (45,500 kg/hr).

The polymers produced by the processes described herein can be used in a wide variety of products and end-use applications. The polymers produced may include linear low density polyethylene, elastomers, plastomers, high density polyethylenes, medium density polyethylenes, low density polyethylenes, polypropylene homopolymers and polypropylene copolymers, including random copolymers and impact copolymers.

The polymers, typically ethylene based polymers, have a density in the range of from 0.86 g/cc to 0.97 g/cc, preferably in the range of from 0.88 g/cc to 0.965 g/cc, more preferably in the range of from 0.900 g/cc to 0.96 g/cc, even more preferably in the range of from 0.905 g/cc to 0.95 g/cc, yet even more preferably in the range from 0.910 g/cc to 0.940 g/cc, and most preferably greater than 0.915 g/cc, preferably greater than 0.920 g/cc, and most preferably greater than 0.925 g/cc. Density is measured in accordance with ASTM-D-1238.

In a class of embodiments, the polymers of the disclosure may comprise a unimodal, bimodal or multimodal molecular weight distribution (MWD). A bimodal polymer/resin is defined herein as a polymer/resin comprising two peaks in it's molecular weight distribution, one of the two peaks having a higher average molecular weight (defined herein as the high molecular weight component) than the other component (defined as the low molecular weight component). A multimodal polymer/resin is defined as a polymer/resin comprising more than two peaks in the molecular weight distribution. In a preferred embodiment, the polymer product is a combination of several polymeric species each having a discrete molecular weight distribution which at least partially overlap such that the resultant polymer has a unimodal molecular weight distribution, preferably wherein the polymer is produced in a single reactor.

Generally the polymers of the disclosure may have a density in the range of from about 0.86g/cc to 0.97 g/cm$^3$ as measured according to ASTM 1505-03.

In one non-limiting embodiment, the polymers of the present disclosure may have a melt index ("MI" or "$I_2$") as measured by ASTM-D-1238-E (190° C., 2.16 kg weight) in the range of from 0.001 dg/min to 25 dg/min. In other non-limiting embodiments, the polymers of the present disclosure may have a MI in a range of from about 0.001 dg/min to about 5 dg/min; in even other non-limiting embodiments a MI in a range of from about 0.01 dg/min to about 5 dg/min in other embodiments; and in still other non-limiting embodiments a MI in a range of from about 0.01 dg/min to about 1 dg/min.

In one non-limiting embodiment, the polymers of the present disclosure may have a melt flow ratio (MFR) in the range of from about 20 to 400. MFR is defined as $I_{21}/I_2$, wherein $I_{21}$ is measured by ASTM-D-1238-F, at 190° C., 21.6 kg weight. In other non-limiting embodiments, the polymers of the present disclosure may have a MFR in a range of from about 25 to 350; in even other non-limiting embodiments, a MFR in a range of from about 30 to 275; and in still other non-limiting embodiments a MFR in a range of from about 35 to 250.

Continuity Additives/Static Control Agents

In processes disclosed herein, it may also be desired to additionally use one or more static control agents to aid in regulating static levels in the reactor. As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. For example, the use of static control agents is disclosed in European Patent No. 0229368 and U.S. Pat. No. 5,283,278 and references cited therein.

The static control agent used may be selected for its ability to receive the static charge in the fluidized bed without adversely affecting productivity. Suitable static control agents may also include aluminum stearate, aluminum distearate, ethoxlated amines, and anti-static compositions such as those provided by Innospec Inc. under the trade name OCTASTAT. For example, OCTASTAT 2000 is a mixture of a polysulfone copolymer, a polymeric polyamine, and oil-soluble sulfonic acid.

Any of the aforementioned control agents, as well as those described in, for example, WO 01/44322, listed under the heading Carboxylate Metal Salt and including those chemicals and compositions listed as antistatic agents may be employed either alone or in combination as a static control agent. For example, the carboxylate metal salt may be combined with an amine containing control agent (e.g., a carboxylate metal salt with any family member belonging to the KEMAMINE (available from Crompton Corporation) or ATMER (available from ICI Americas Inc.) family of products).

In some embodiments, the static control agent added to the reactor may be a combination of two or more of the above listed static control agents. In other embodiments, the static control agent(s) may be added to the reactor in the form of a solution or a slurry, and may be added to the reactor as an individual feed stream or may be combined with other feeds prior to addition to the reactor. For example, the static control agent may be combined with the catalyst or catalyst slurry prior to feeding the combined catalyst-static control agent mixture to the reactor.

Other useful static control agents are described in the US 2008/0045663.

In some embodiments, the static control agent may be added to the reactor in an amount ranging from 0.05 to 200 ppm, or in the range of from 2 to 100 ppm, or in the range of 4 to 50 ppm, based on the weight of all feeds to the reactor, excluding recycle.

EXAMPLES

The following examples are put forth so as to provide those skilled in the art with a complete disclosure and description of how to make and use the compounds of the invention, and are not intended to limit the scope of that which the inventors regard as their invention.

Example 1

Procedure for Preparing of Spray-Dried Methylalumoxane (SDMAO)

Feed Stock Preparation:

The feed stock slurry was prepared by first adding 325.7 kg (718 lbs.) of toluene, 223.6 kg (493 lbs.) of 10 wt % methylaluminoxanes (MAO) in toluene, and 30.4 kg (67 lbs.) of CABOSIL to a 1.02 m³ (270 gallon) feed tank. The mixture was stirred overnight at about 38° C. before spray drying.

Spray-Drying Process:

There are three key process variables in the spray-drying process that affect the production rate and the particle morphology. The first important factor is the atomizer speed which affects the particle size of the final product. The second factor is the outlet temperature. The third is the slurry feed rate; however, it usually has minimal effect on the performance of the final product. This SDMAO batch was prepared at 90% atomizer speed, 90° C. outlet temperature and approximately 74.8 kg/h (165 lb/h) slurry feed rate. The aluminum content (wt %) of the resulting SDMAO is 16.2.

The procedure for preparing silica supported methylalumoxane (SMAO) used is according to that disclosed in U.S. Pat. No. 7,220,804 B1.

Example 2

Typical Procedure for Preparing Supported Catalyst in Oil Slurry Form

In this procedure, transition metal compounds in their original form were first mixed with KAYDOL oil. SDMAO or SMAO was then added to this mixture and the resulting slurry was rolled at room temperature overnight. In most cases studied, this mixing time was sufficient to produce a fully activated catalyst ready to be used for polymerization. Typical Al/TM (Transition Metal) ratios used for the resulting slurry catalysts range from 50-200 and solid catalyst contents in KAYDOL oil is around 5-25%. For laboratory gas phase polymerization study, 5 grams of SMAO (4.5 mmol Al/g silica) was normally employed as scavenger.

Example 3

Procedure for Ethylene Polymerization in Laboratory Gas Phase Reactor

The gas phase reactor employed is a 1.65 liter, stainless steel autoclave equipped with a variable speed mechanical agitator. For maximum mixing, the reactor is normally operated at a 45 degree angle from its vertical position during polymerization. In a standard HDPE run, the reactor was first charged with 400 g of NaCl and dried by heating at 95° C. under stream of Nitrogen for an hour. After baking out the reactor, the temperature is lowered to 60° C. to introduce 5 g of SMAO (silica supported methylalumoxane) as a scavenger with help of nitrogen pressure. After adding SMAO, the reactor was sealed and components were gently stirred. The reactor was then charged with hydrogen (0-10,000 ppm) and 1-hexene (C6/C2=0.003 to 0.007). The reactor is then pressurized with 1.62 MPa (220 psig) of ethylene. Once the system reaches a steady state, catalyst is charged into the reactor using a stainless steel bomb to start polymerization. The reactor temperature is then brought up to the specified temperature (85° C. or 100° C.) and maintained at this temperature through the run. The polymerization is typically carried out for 60 minutes and during this time hydrogen, C6/C2 ratio and ethylene pressure remained constant. At the end of 60 minutes, the reactor is cooled down, vented and opened. The resulting mixture is then washed with water, methanol and dried.

Molecular weight measurement: Mw and Mn were measured by gel permeation chromatography on a Waters 150° C. GPC instrument equipped with differential refraction index detectors. The GPC columns were calibrated by running a series of molecular weight standards and the molecular weights were calculated using Mark Houwink coefficients for the polymer in question.

The following catalysts were used in the examples.

Catalyst A and B: Phenoloxadiazole complex, obtained from Symyx Technologies, Santa Clara, Calif.

Catalyst C: Bis (n-butylcyclopentadienyl)zirconium dichloride, obtained from Boulder Scientific Company, Boulder, Colo.

Catalyst D: (n-Propylcyclopentadienyl) (tetramethylcyclopentadienyl)-zirconium dichloride, obtained from Boulder Scientific Company, Boulder, Colo.

Catalyst E: Bis (n-propylcyclopentadienyl)hafnium dimethyl, obtained from Boulder Scientific Company, Boulder, Colo.

Catalyst F: Group-15 containing triamino complex, obtained from Boulder Scientific Company, Boulder, Colo.

The structures of Catalysts A-F are shown below.

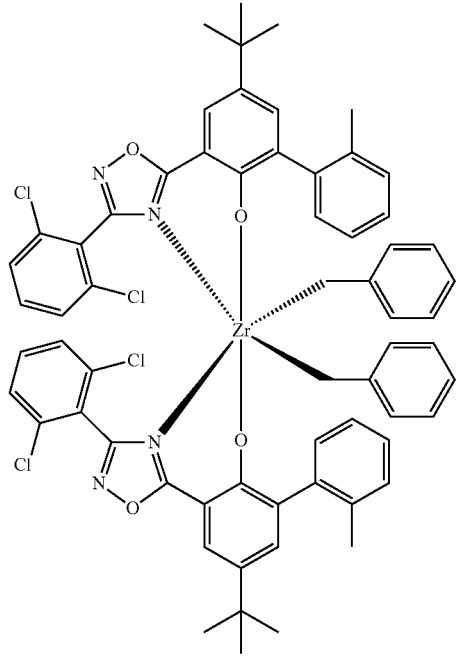

Catalyst A

Catalyst B

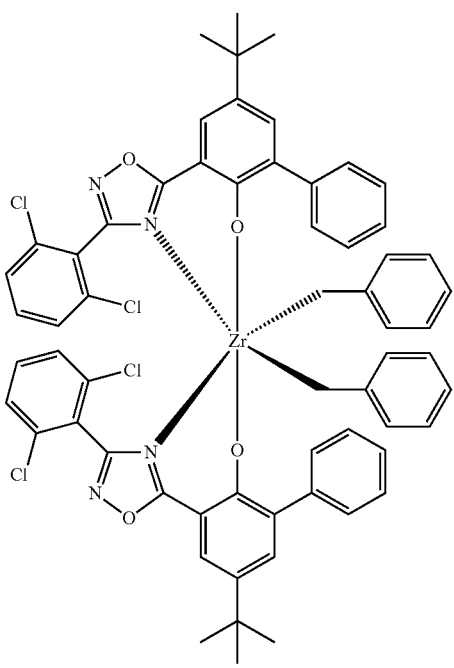

Catalyst C

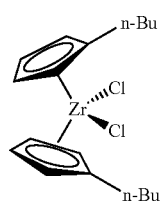

Catalyst D

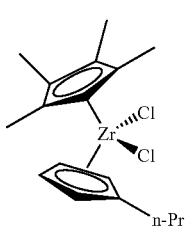

Catalyst E

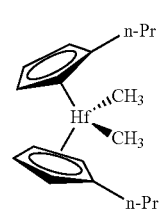

Catalyst F

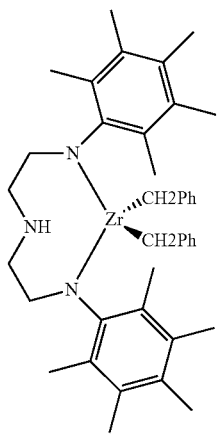

Table 1 shows the weight average molecular weight (Mw) of the component catalysts under different level of $H_2$.

TABLE 1

| Example | Catalyst | Mw (0 ppm H2) | Mw (3000 ppm H2) | Mw (10000 ppm H2) |
|---|---|---|---|---|
| 4 | A | 25224 | 24398 | — |
| 5 | B | — | 104240 | 110932 |
| C1 | C | 66664 | 20462 | — |
| C2 | D | 146255 | 21650 | — |
| C3 | E | 178702 | 23006 | — |
| C4 | F | 759822 | 522539 | 160160 |

As shown from Table 1, the catalyst compounds A and B exhibited no or very low Mw movement over a wide range of hydrogen ($H_2$). In contrast, catalyst compounds C, D, E and F showed a large Mw movement over the range of hydrogen.

Various combinations of catalysts (catalyst pairs) were tested, with the catalyst pairs listed in Table 2.

TABLE 2

| Catalyst Pair | LMW Component | HMW Component |
|---|---|---|
| I | Catalyst A | Catalyst E |
| II | Catalyst A | Catalyst F |
| III | Catalyst B | Catalyst F |

Catalyst Pair I was tested at two hydrogen levels, with the results shown in Table 3 and FIG. 1.

TABLE 3

| Example | Catalyst Pair | Support/ Activator | $H_2$ (ppm) | Mw | Mn | Mw/Mn |
|---|---|---|---|---|---|---|
| 6 | I | SDMAO | 0 | 124233 | 6842 | 18.2 |
| 7 | I | SDMAO | 3000 | 21439 | 6678 | 3.2 |

As can be seen from the GPC overlay in FIG. 1, the LMW component showed no movement while the HMW component moved lower as $H_2$ increased from 0 ppm to 3,000 ppm.

Figure 2:
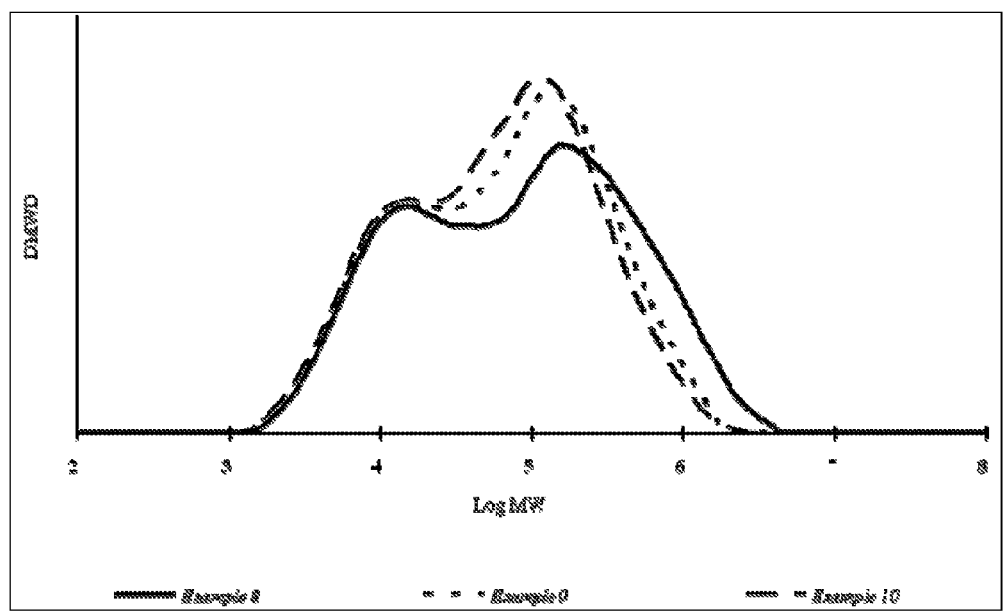
FIG. 2 presents GPC results for polymers formed in Examples 8, 9, and 10.

Catalyst Pair II was tested at three hydrogen levels, with the results shown in Table 4 and FIG. 2.

TABLE 4

| Example | Catalyst Pair | Support/Activator | $H_2$ (ppm) | Mw | Mn | Mw/Mn |
|---|---|---|---|---|---|---|
| 8 | II | SMAO | 2000 | 257187 | 23804 | 10.8 |
| 9 | II | SMAO | 6000 | 157050 | 21774 | 7.2 |
| 10 | II | SMAO | 10000 | 138869 | 21027 | 6.6 |

As can be seen from the GPC overlay in FIG. 2, the LMW component showed no movement, while the HMW component moved lower as $H_2$ increased from 2,000 ppm to 10,000 ppm.

Figure 3:
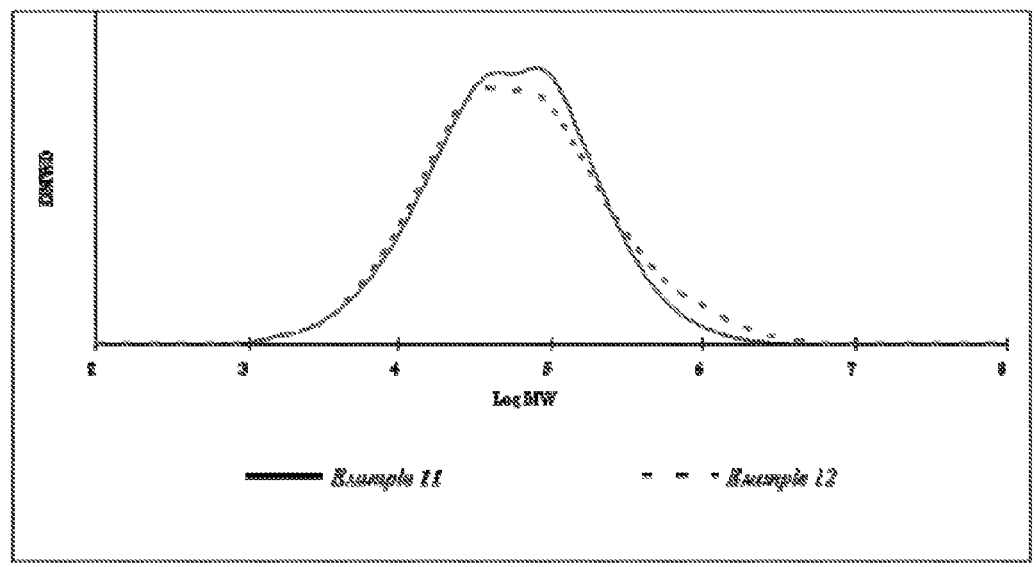
FIG. 3 presents GPC results for polymers formed in Examples 11 and 12.

Catalyst Pair III was tested at two hydrogen levels, with the results shown in Table 5 and FIG. 3. As can be seen from the GPC overlay in FIG. 3, the LMW component showed no movement, while the HMW component moved lower as $H_2$ increased from 2,000 ppm to 6,000 ppm.

TABLE 5

| Example | Catalyst Pair | Support/Activator | $H_2$ (ppm) | Mw | Mn | Mw/Mn |
|---|---|---|---|---|---|---|
| 11 | III | SMAO | 2000 | 157073 | 25334 | 6.2 |
| 12 | III | SMAO | 6000 | 111920 | 26648 | 4.2 |

Figure 4:
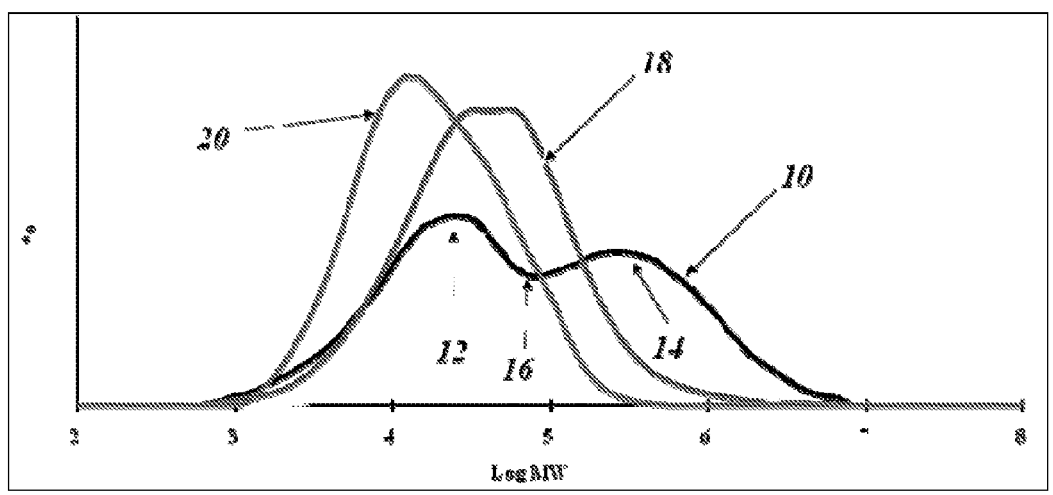
FIG. 4 provides a molecular weight distribution graph of the output of the individual catalyst components of an embodiment of the instant disclosure.

Turning now to FIG. 4, the molecular weight distribution of a polymer produced utilizing two catalyst system with a ratio of Catalyst F/Catalyst D of 2.5 is shown as trace 10. As the figure shows, the two catalyst system produces a bimodal molecular weight distribution having a local maximum 12 for the low molecular weight portion and a local maximum 14 for the high molecular weight portion, separated by a local minimum 16, wherein a local maximum is defined as the point x*, wherein there exists some $\epsilon > 0$, such that $f(x^*) \geq f(x)$ when $|x-x^*| < \epsilon$. Taken another way, the point where the second derivative is $d^2(x) = 0$ preceded by a function with a positive slope and followed by a function with a negative slope. Likewise, a local minimum point is defined as the point x*, if $f(x^*) \leq f(x)$ when $|x-x^*| < \epsilon$. Taken another way, the point where the second derivative is $d^2(x) = 0$ preceded by a function with a negative slope and followed by a function with a positive slope. On a graph of the function, the local maxima look like hill tops and the local minima look like the bottoms of valleys.

The polymer produced under similar conditions utilizing Catalyst B is labeled 18, and the polymer produced under similar conditions utilizing Catalyst A is labeled 20.

Samples of polymer made using inventive catalyst systems comprising Catalyst B and comparative polymers were prepared in a pilot plant scale in a single gas phase reactor at a reactor temperature of 105° C., which had the polymerization condition and properties shown in Table 6.

TABLE 6

| Example | C5 | 13 |
|---|---|---|
| Catalyst Composition | Cat F + Cat C | Cat F + Cat C + Cat B |
| Temp(° C.) | 105 | 105 |
| C2 partial Preesure (psi) | 220 | 220 |
| C6/C2 molar ratio | 0.0015 | 0.0018 |
| H2/C2 molar ratio | 0.0015 | 0.0017 |
| Flow Index (FI, dg/min) | 27.6 | 27.1 |
| Melt Index (MI, dg/min) | 0.11 | 0.11 |
| MFR (FI/MI) | 251 | 246 |
| Density (g/cc) | 0.9587 | 0.9584 |

Figure 5:
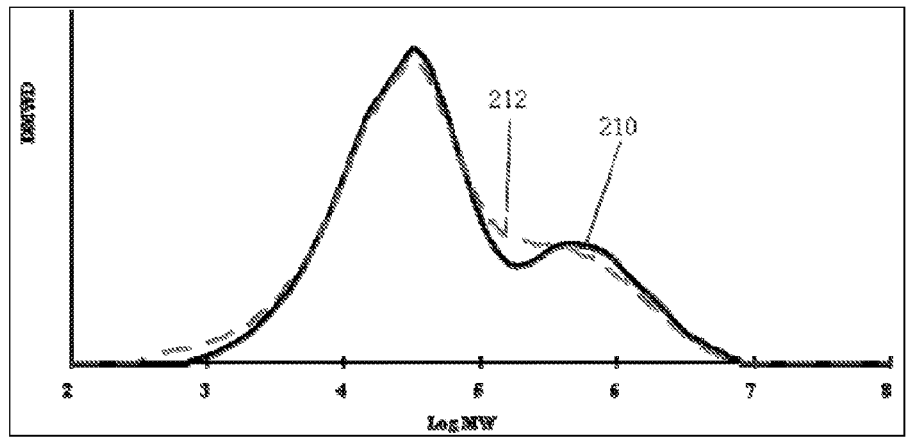
FIG. 5 provides a molecular weight distribution graph of Example 13 and Comparative Example 5.

As shown in FIG. 5, the molecular weight distribution of the comparative two catalyst combination (Example C5) of Catalysts F and C, (solid line 210) is bimodal, while the inventive three catalyst combination (Example 13) of Catalysts F, C with B produces a polymer having a single maximum and a broad molecular weight distribution (dashed line 212) at essentially the same melt flow rate and the same density. As is shown in FIG. 5, the intermediate molecular weight Catalyst B "fills in" the valley between the low molecular weight component and the high molecular weight component. As a result of "fill in" the valley, blow molded polymer products using this polymer may exhibit improved process capability.

Samples of polymer made using inventive catalyst systems comprising Catalyst A and comparative polymers were prepared in a pilot plant scale in a single gas phase reactor at a reactor temperature of 90-95° C., which had the polymerization condition and properties shown in Table 7.

TABLE 7

| Example | C6 | 14 | 15 |
|---|---|---|---|
| Catalyst Composition | Cat F + Cat D | Cat F + Cat D + Cat A | Cat F + Cat D + Cat A |
| Temp(° C.) | 90 | 95 | 95 |
| C2 partial Preesure (psi) | 220 | 220 | 220 |
| C4/C2 molar ratio | 0.01 | 0.0090 | 0.0090 |
| H2/C2 molar ratio | 0.0043 | 0.0031 | 0.0050 |
| Flow Index (FI, dg/min) | 11.6 | 12.9 | 13.4 |
| Melt Index (MI, dg/min) | 0.087 | 0.077 | 0.139 |
| MFR (FI/MI) | 133 | 168 | 96 |
| Density (g/cc) | 0.9522 | 0.9521 | 0.9505 |

Figure 6:
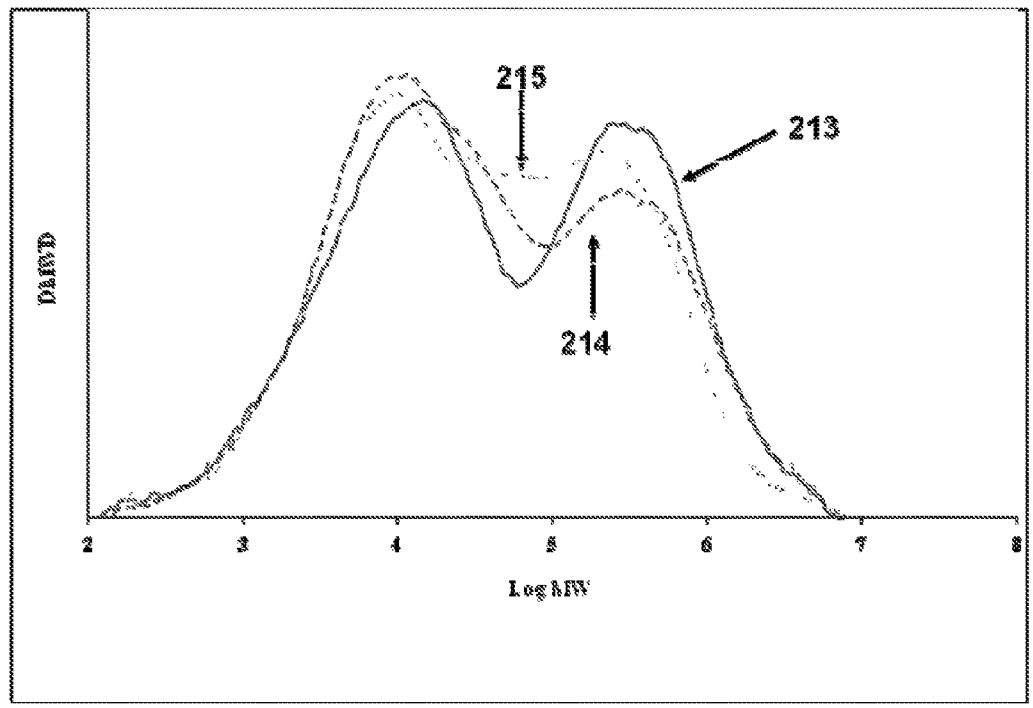
FIG. 6 provides a molecular weight distribution graph of Examples 14 and 15 and Comparative Example 6.

As shown in FIG. 6, the molecular weight distribution of a comparative two catalyst combination (Example C6) of Catalysts F and D (solid line 213) is bimodal, while the inventive three catalyst combination (Examples 14 and 15) of Catalysts F, D, and A produces polymer having much shallower valley (dashed lines 214 and 215). Also can be seen in FIG. 6, the LMW component showed no movement, while the HMW component move lower as $H_2$ increased from H2/C2=0.0031 to 0.0050. As a result of "fill in" the valley, blown film made with the three component system may exhibit improved TD tear.

Accordingly, as the data shows, the properties of the polymers produced using the instant catalyst systems may be controlled by changing the hydrogen concentration in the reactor, where one of the catalysts is affected by the hydrogen concentration in the reactor and at least one of the catalysts has essentially no hydrogen response (is not affected by the hydrogen concentration in the reactor).

As described above, mixed (e.g., bimetallic) catalyst systems according to embodiments disclosed herein include at least two catalyst compounds, where one or more of the catalyst compounds have essentially no hydrogen response. The catalyst systems according to embodiments disclosed herein may allow for production of polymers having essentially unimodal, bimodal, or multimodal composition distributions in a single reactor. Limiting the number of catalyst compounds in catalyst systems according to embodiments disclosed herein that have a hydrogen response may allow for control of polymer properties that is considerably less complicated and more predictable, as there are fewer independent variables affecting polymerization dynamics (such as a second catalyst having a different hydrogen response).

The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited.

All documents cited herein are fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein.

What is claimed is:

1. A polymerization catalyst system comprising:
a first catalyst compound; and
a second catalyst compound;
wherein the first catalyst compound comprises an oxadiazole-containing compound having essentially no hydrogen response, said oxadiazole compound having the following structure:

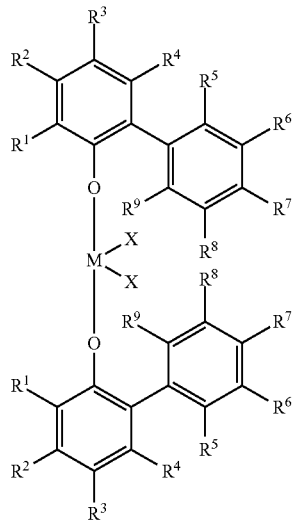

where:
M is selected from the group consisting of Ti, Zr, and Hf;
at least one of $R^1$ through $R^9$ is substituted with a moiety having the following structure:

structure Ia is attached at any one of $R^1$ through $R^9$ at the $R^{10}$ or $R^{11}$ position;
at least one of nitrogen $N^1$ or $N^2$ forms a dative bond with metal M;
each of $R^1$ through $R^{11}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and
X is least one leaving group.

2. The polymerization catalyst system of claim 1, further comprising at least one of a support and an activator.

3. The polymerization catalyst system of claim 1, wherein the oxadiazole compound has the following structure:

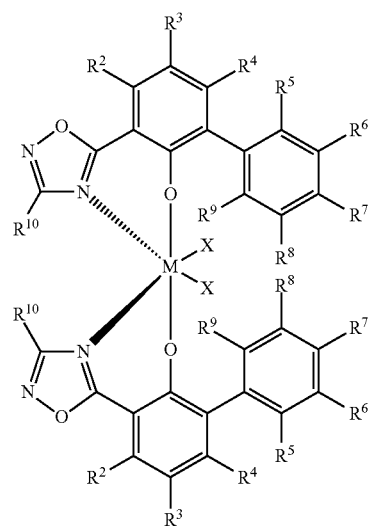

where M is selected from the group consisting of Ti, Zr, and Hf;
each of $R^2$ through $R^{10}$ are independently selected from the group consisting of hydride, hydrocarbyl, lower hydrocarbyl, substituted hydrocarbyl, heterohydrocarbyl, alkyl, lower alkyl, substituted alkyl, heteroalkyl, alkenyl, lower alkenyl, substituted alkenyl, heteroalkenyl, alkynyl, lower alkynyl, substituted alkynyl, heteroalkynyl, alkoxy, lower alkoxy, aryloxy, hydroxyl, alkylthio, lower alkyl thio, arylthio, thioxy, aryl, substituted aryl, heteroaryl, aralkyl, aralkylene, alkaryl, alkarylene, halide, haloalkyl, haloalkenyl, haloalkynyl, heteroalkyl, heterocycle, heteroaryl, heteroatom-containing group, silyl, boryl, phosphino, phosphine, amino, and amine; and X is least one leaving group.

4. The polymerization catalyst system of claim 1, wherein the oxadiazole compound has the following structure:

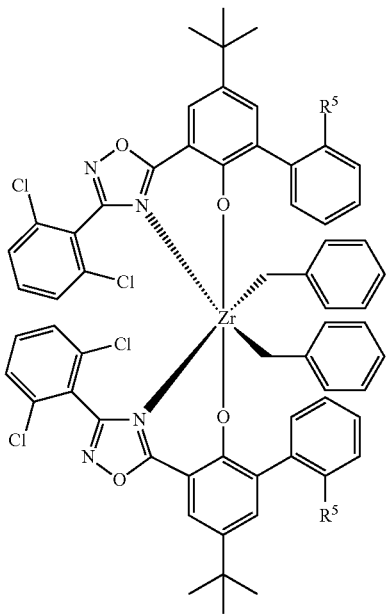

and wherein each $R^5$ is independently selected from the group consisting of hydride and $C_1$ to $C_4$ alkyl.

5. The polymerization catalyst system of claim 4, wherein at least one $R^5$ is methyl.

6. The polymerization catalyst system of claim 4, wherein at least one $R^5$ is hydride.

7. The polymerization catalyst system of claim 1, wherein the second catalyst compound comprises at least one of catalyst compound selected from a metallocene and a Group 15-containing catalyst compound.

8. The polymerization catalyst system of claim 1, wherein the second catalyst compound comprises at least one metallocene selected from those having the following structure:

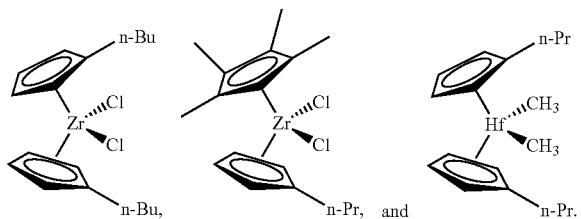

9. The polymerization catalyst of claim 7, wherein the Group 15-containing catalyst compound, is selected from those having the following structures:

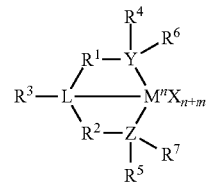

wherein
M is a Group 3 to 14 metal,
each X is independently a leaving group;
n is the oxidation state of M;
m is the formal charge of the YLZ,
L is a Group 15 or 16 element;
Y is a Group 15 element;
Z is a Group 15 element;
$R^1$ and $R^2$ are independently a $C_1$ to $C_{20}$ hydrocarbon group, a heteroatom containing group having up to twenty carbon atoms, silicon, germanium, tin, lead, phosphorus, or a halogen;
$R^1$ and $R^2$ may be interconnected to each other;
$R^3$ is absent or is a hydrogen, a group 14 containing group, a halogen, or a heteroatom containing group;
$R^4$ and $R^5$ are independently an aryl group, a substituted aryl group, a cyclic alkyl group, a substituted cyclic alkyl group, or multiple ring system; and
$R^6$ and $R^7$ are independently absent, or hydrogen, an alkyl group, halogen, heteroatom or a hydrocarbyl group.

10. The polymerization catalyst system of claim 8, wherein the second catalyst compound further comprises a Group 15-containing catalyst compound represented by the following structure:

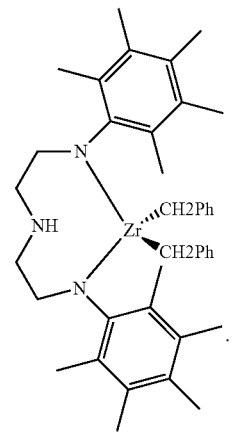

11. The polymerization catalyst system of claim 7, wherein the catalyst system is capable of producing a polymer product having an essentially unimodal molecular weight distribution.

12. The polymerization catalyst system of claim 7, wherein the catalyst system is capable of producing a polymer product having a bimodal or multimodal molecular weight distribution.

13. A process for producing a polyolefin, comprising contacting at least one olefin monomer with the catalyst system of claim 1 in a polymerization reactor to form a polyolefin.

* * * * *